(12) United States Patent
Robertsson et al.

(10) Patent No.: US 11,002,870 B2
(45) Date of Patent: May 11, 2021

(54) METHOD FOR DEGHOSTING AND REDATUMING OPERATOR ESTIMATION

(71) Applicant: SEISMIC APPARITION GmbH, Zurich (CH)

(72) Inventors: Johan Robertsson, Wald (CH); Dirk-Jan Van Manen, Otelfingen (CH); Fredrik Andersson, Esloev (SE); Kurt Eggenberger, Maienfeld (CH)

(73) Assignee: SEISMIC APPARITION GmbH, Zurich (CH)

( * ) Notice: Subject to any disclaimer, the term of this patent is extended or adjusted under 35 U.S.C. 154(b) by 279 days.

(21) Appl. No.: 16/119,630

(22) Filed: Aug. 31, 2018

(65) Prior Publication Data

US 2019/0018157 A1    Jan. 17, 2019

Related U.S. Application Data

(63) Continuation of application No. PCT/IB2017/051064, filed on Feb. 24, 2017.

(30) Foreign Application Priority Data

Mar. 4, 2016  (GB) .................................... 1603746
Dec. 16, 2016  (GB) .................................... 1621410

(51) Int. Cl.
*G01V 1/36* (2006.01)
*G01V 1/30* (2006.01)
*G01V 1/38* (2006.01)

(52) U.S. Cl.
CPC .............. *G01V 1/364* (2013.01); *G01V 1/301* (2013.01); *G01V 1/36* (2013.01); *G01V 1/3808* (2013.01);
(Continued)

(58) Field of Classification Search
None
See application file for complete search history.

(56) References Cited

U.S. PATENT DOCUMENTS

2002/0103606 A1    8/2002   Fokkema et al.
2003/0105592 A1    6/2003   Fokkema et al.
(Continued)

OTHER PUBLICATIONS

International Search Report dated Jun. 7, 2017 in PCT/IB2017/051064, citing documents AA, AB, AC and AN therein, 4 pages.
(Continued)

*Primary Examiner* — Roy Y Yi
(74) *Attorney, Agent, or Firm* — Oblon, McClelland, Maier & Neustadt, L.L.P.

(57) ABSTRACT

A method is described for removing the surface ghost from and/or separating wave field data and/or for estimating redatuming operators of the wave field data by effective use of a transform that that relies on the non-uniform distribution of distances with respect to a reference surface or of tuned-source radiation directions of sources and or the non-uniform distribution of receivers with respect to a reference surface to partition or map the wave field from at least two different cones in the transformed domain and using the contribution of sources and or receivers inside at least one of the at least two different cones to estimate a first wave field of interest, a second separated or ghost wave field and/or redatuming operator.

21 Claims, 7 Drawing Sheets

(52) U.S. Cl.
CPC ...... *G01V 1/3852* (2013.01); *G01V 2210/242* (2013.01); *G01V 2210/44* (2013.01); *G01V 2210/56* (2013.01)

(56) References Cited

U.S. PATENT DOCUMENTS

| | | |
|---|---|---|
| 2003/0125880 A1 | 7/2003 | Fokkema et al. |
| 2005/0128874 A1* | 6/2005 | Herkenhoff ............ G01V 1/003 367/56 |
| 2010/0211321 A1* | 8/2010 | Ozdemir ................ G01V 1/364 702/14 |
| 2011/0292762 A1* | 12/2011 | Ozdemir .................. G01V 1/38 367/24 |
| 2013/0329520 A1 | 12/2013 | Van Borselen |
| 2014/0278119 A1 | 9/2014 | Halliday et al. |

OTHER PUBLICATIONS

Ozdemir, A.K., et al., "Optimized deghosting of over/under towed-streamer data in the presence of noise", The Leading Edge, vol. 27 No. 2, XP002545879, Feb. 2008, pp. 190-199.

Candes, E., et al., "A Fast Butterfly Algorithm for the Computation of Fourier Integral Operators", Multiscale Modeling & Simulation, vol. 7 No. 4, 2009, pp. 1727-1750.

Halliday, D., et al., "Full-wavefield, towed-marine seismic acquisition and applications", SEG Las Vagas 2012 Annual Meeting, 2012, pp. 1-5.

Halliday, D., et al., "Source-side deghosting: A comparison of Approaches", 83$^{rd}$ Annual International Meeting, SEG, Expanded Abstracts, 2013, pp. 67-71.

Hopperstad, J.-F., "Where is the center of a multi-depth marine source array?", 78$^{th}$ Annual International Meeting, SEG, Expanded Abstracts, 2008, pp. 40-44.

Hopperstad, J.-F., "Fundamental Principles of Isotropic Marine Source Design", 70$^{th}$ EAGE Conference & Exhibition, Extended Abstracts B025, Jun. 2008, 5 pages.

Muijs, R., et al., "Prestack depth migration of primary and surface-related multiple reflections: Part I—Imaging", Geophysics, vol. 72 No. 2, Mar.-Apr. 2007, pp. S59-S69.

O'Neil, M., et al., "A new class of analysis-based fast transforms", Technical Report, DTIC Document, 2007, pp. 1-56 with cover pages.

Robertsson, J.O.A., et al., "Full-wavefield, Towed-marine Seismic Acquisition and Applications", 74$^{th}$ EAGE Conference & Exhibition incorporating SPE EUROPEC 2012, Z015, Jun. 4-7, 2012, pages.

Robertsson, J.O.A., et al., "Tools and Techniques: Marine Seismic Methods", Geophysics, 2$^{nd}$ Edition, vol. 11, 2015, pp. 175-208.

Stork, C., et al., "Predicting and removing complex 3D surface multiples with WEM modeling—an alternative to 3D SRME for wide azimuth surveys?", SEG/NEW Orleans 2006 Annual Meeting, pp. 2679-2683.

Van Melle, F.A., et al., "Ghost Reflections Caused by Energy Initially Reflected above the Level of the Shot", Geophysics, vol. 18, pp. 793-804.

Bracewell, R., "The Fourier Transform & Its Applications", McGraw-Hill Science, 1999, pp. 111-115, and 268-269.

\* cited by examiner

METHOD FOR DEGHOSTING AND REDATUMING OPERATOR ESTIMATION

CROSS-REFERENCE TO RELATED APPLICATIONS

This application is a continuation of PCT Application No. PCT/IB2017/051064, filed Feb. 24, 2017, which claims priority to Great Britain Application No. 1603746.7, filed Mar. 4, 2016, and Great Britain Application No. 1621410.8, filed Dec. 16, 2016. The entire contents of the above-identified applications are incorporated herein by reference.

FIELD

The present disclosure relates to methods for separating wave fields, including removing ghost reflections caused by the presence of, for example, a free surface reflector and or for estimating wave field redatuming operators.

DESCRIPTION OF RELATED ART

The current disclosure relates to marine seismic surveying, including in particular marine seismic data acquisition. The general practice of marine seismic surveying is described below in relation to FIG. 9.

Prospecting for subsurface hydrocarbon deposits (901) in a marine environment (FIG. 9) is routinely carried out using one or more vessels (902) towing seismic sources (903-905). The one of more vessels can also tow receivers or receivers (906-908) can be placed on the seabed.

Seismic sources typically employ a number of so-called airguns (909-911) which operate by repeatedly filling up a chamber in the gun with a volume of air using a compressor and releasing the compressed air at suitable chosen times (and depth) into the water column (912).

The sudden release of compressed air momentarily displaces the seawater, imparting its energy on it, setting up an impulsive pressure wave in the water column propagating away from the source at the speed of sound in water (with a typical value of around 1500 m/s) (913).

Upon incidence at the seafloor (or seabed) (914), the pressure wave is partially transmitted deeper into the subsurface as elastic waves of various types (915-917) and partially reflected upwards (918). The elastic wave energy propagating deeper into the subsurface partitions whenever discontinuities in subsurface material properties occur. The elastic waves in the subsurface are also subject to an-elastic attenuation which reduces the amplitude of the waves depending on the number of cycles or wavelengths.

Some of the energy reflected upwards (920-921) is sensed and recorded by suitable receivers placed on the seabed (906-908), or towed behind one or more vessels. The receivers, depending on the type, sense and record a variety of quantities associated with the reflected energy, for example, one or more components of the particle displacement, velocity or acceleration vector (using geophones, mems [microelectromechanical] or other devices, as is well known in the art), or the pressure variations (using hydrophones). The wave field recordings made by the receivers are stored locally in a memory device and/or transmitted over a network for storage and processing by one or more computers.

Waves emitted by the source in the upward direction also reflect downward from the sea surface (919), which acts as a nearly perfect mirror for acoustic waves.

One seismic source typically consist of one or more airgun arrays (903-905): that is, multiple airgun elements (909-911) towed in, e.g., a linear configuration spaced apart several meters and at substantially the same depth, whose air is released (near-) simultaneously, typically to increase the amount of energy directed towards (and emitted into) the subsurface.

Seismic acquisition proceeds by the source vessel (902) sailing along many lines or trajectories (922) and releasing air from the airguns from one or more source arrays (also known as firing or shooting) once the vessel or arrays reach particular pre-determined positions along the line or trajectory (923-925), or, at fixed, pre-determined times or time intervals. In FIG. 9, the source vessel (902) is shown in three consecutive positions (923-925), also called shot positions.

Typically, subsurface reflected waves are recorded with the source vessel occupying and shooting hundreds of shots positions. A combination of many sail-lines (922) can form, for example, an areal grid of source positions with associated inline source spacings (926) and crossline source spacings. Receivers can be similarly laid out in one or more lines forming areal configuration with associated inline receiver spacings (927) and crossline receiver spacings.

SUMMARY

A method for estimating redatuming operators and/or removing the surface ghost reflection suited for seismic applications and other purposes is presented, particularly for source-side de-ghosting, substantially as shown in and/or described in connection with at least one of the figures, and as set forth more completely in the claims.

Advantages, aspects and novel features of the present disclosure, as well as details of an illustrated embodiment thereof, may be more fully understood from the following description and drawings.

BRIEF DESCRIPTION OF THE DRAWINGS

In the following description reference is made to the attached figures, in which.

DETAILED DESCRIPTION

Figure 1:
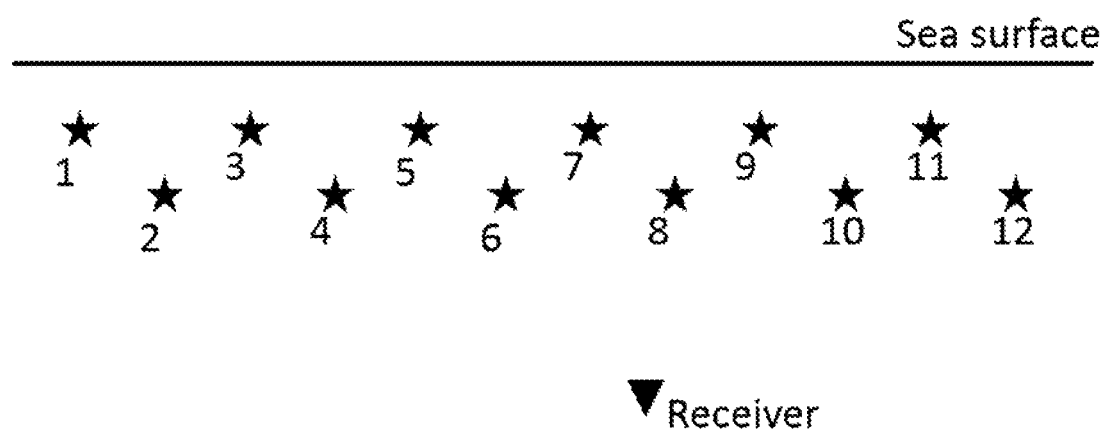
FIG. 1 illustrates acquisition of one shot-line in a common-receiver gather seismic data set (receiver location illustrated by the triangle) using the method for source-side de-ghosting with the source positions indicated by solid black stars where the number shown corresponds to the shot points where the source is activated consecutively during the survey recording of a one wave field signal (also referred to as a trace)

Surface seismic data typically consists of ghosts as energy propagating upwards reflects downwards from the Earth's surface (i.e., the sea surface in towed marine seismics). Ghosts appear both on the source-side as well as on the receiver-side. For a general review, see Robertsson et al. (2015). Whereas the receiver-side ghost problem has been studied in detail and many different solutions have been proposed, the source-side ghost problem has remained largely unsolved.

In the following we will be describing a solution to the source-side ghost problem. However, by using the principle of reciprocity, the solution is equally well applicable to receiver-side deghosting.

Closely related to the ghost problem is that of characterizing redatuming operators of the wave field. Knowledge of such operators will not only allow for removing the ghosts. In addition, knowledge of redatuming operators can be used to solve many other problems in processing of seismic data such as regularization of seismic data, imaging of seismic data or removal of multiples in seismic data for example.

Regularization is often used in seismic data processing to for instance interpolate acquired data onto a desired grid (e.g., equidistant) to for instance remove perturbations that are often encountered in reality as actual source and receiver locations will differ from the optimal or desired ones. Knowledge of the redatuming operator allows for the downwards or upwards continuation of a wave field which also may encompass the construction of the wave field at desired locations.

Imaging of seismic data involves two steps: (1) the propagation of recorded data and the source wavelet through an estimation of a sub-surface velocity model and (2) computing an imaging condition at sub-surface points comparing the propagated recorded wave field with the propagated source wave field. The act of propagation often involves the use of redatuming operators as is the case in for instance wave equation migration as described by for instance Muijs et al. (2007). Knowledge of the redatuming operator at the recording location and or the source location can therefore be directly used in imaging algorithms to facilitate the propagation of the wave fields from the source and or receiver locations.

A plethora of multiple attenuation methods exists. Many of these algorithms rely on propagating (i.e., redatuming) recorded and or generated wave fields. An example of such a method for multiple attenuation that would directly benefit from an estimate of the redatuming operator at the recording location and or source location is described by Stork et al. (2006), where wave fields are propagated through an Earth sub-surface model to predict multiples.

Deghosting marine seismic data, seabed seismic data, borehole VSP seismic data as well as dynamite land seismic data (or other buried source), which also have a source ghost, attempts to remove from the recorded seismic signals the effects of a strong reflector in the vicinity of the sources, such as the sea surface or the land-air interface.

Source side deghosting was first described by van Melle and Weatherburn (1953) who dubbed the reflections, from energy initially reflected above the level of the source, by optical analogy, ghosts. Robertsson et al. (2008), Halliday et al. (2012) and Robertsson et al. (2012) describe a solution to this problem relying on the computation of source-side vertical gradients (dipole sources). They proposed to do this from finite-difference approximations to over/under sources. Aliasing is likely to be a major problem to acquire such a data set that can be deghosted for the entire frequency band without requiring an extremely dense carpet of shot points beyond what is economically and practically feasible.

The current disclosure describes a different approach that does not rely on the explicit computation of vertical gradients on the Source side. The operational requirements are therefore different and considerably more attractive compared to the method by Robertsson et al. (2008), Halliday et al. (2012) and Robertsson et al. (2012). The method may also be extended to a method of determining a redatuming operator which in turn can be applied to remove multiples from recorded wave field signals or in other processing steps of particular interest to seismic exploration and/or seismic processing to reconstruct an image of the subsurface of the earth.

The slowest observable (apparent) velocity of a signal along a line or carpet of recordings in any kind of wave experimentation is identical to the slowest physical propagation velocity in the medium where the recordings are made. As a result, after a spatial and temporal Fourier transform, large parts of the frequency-wavenumber ($\omega k$) spectrum inside the Nyquist frequency and wavenumber tend to be empty. In particular, for marine reflection seismic data (Robertson et al., 2015), the slowest observable velocity of arrivals corresponds to the propagation velocity in water (around 1500 m/s).

Figure 8:
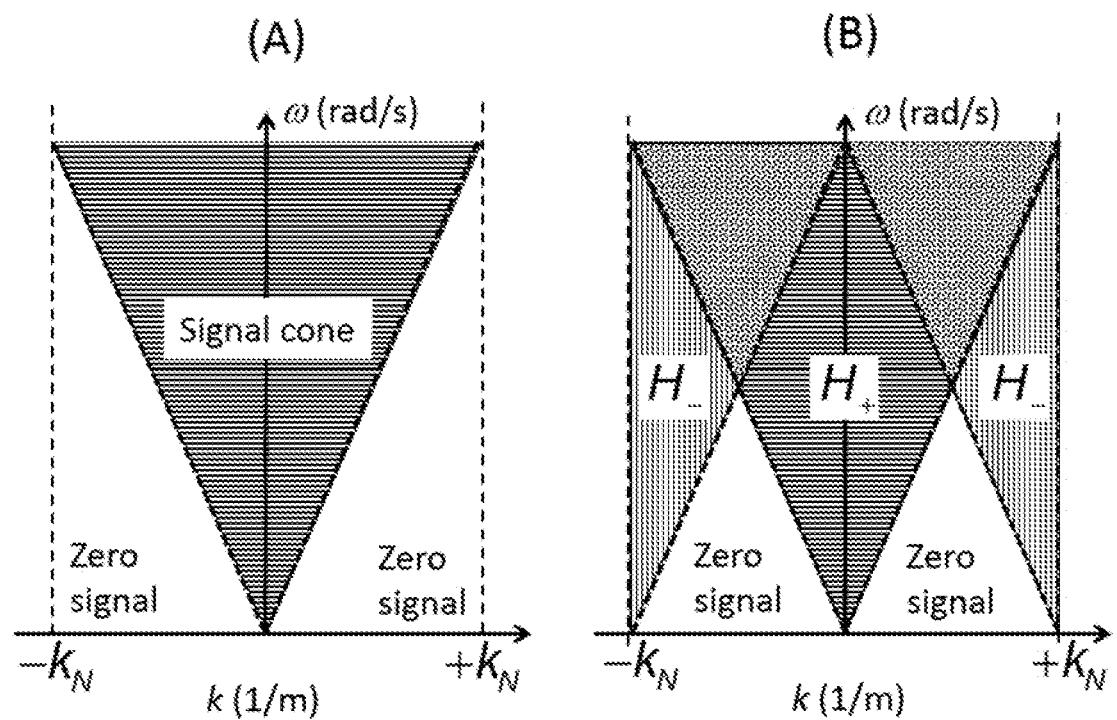
FIGS. 8A,B illustrate how in a conventional marine seismic survey all signal energy of sources typically sits inside a "signal cone" bounded by the propagation velocity of the recording medium and how this energy can be split in a transform domain by applying a modulation to a second source.
Figure 9:
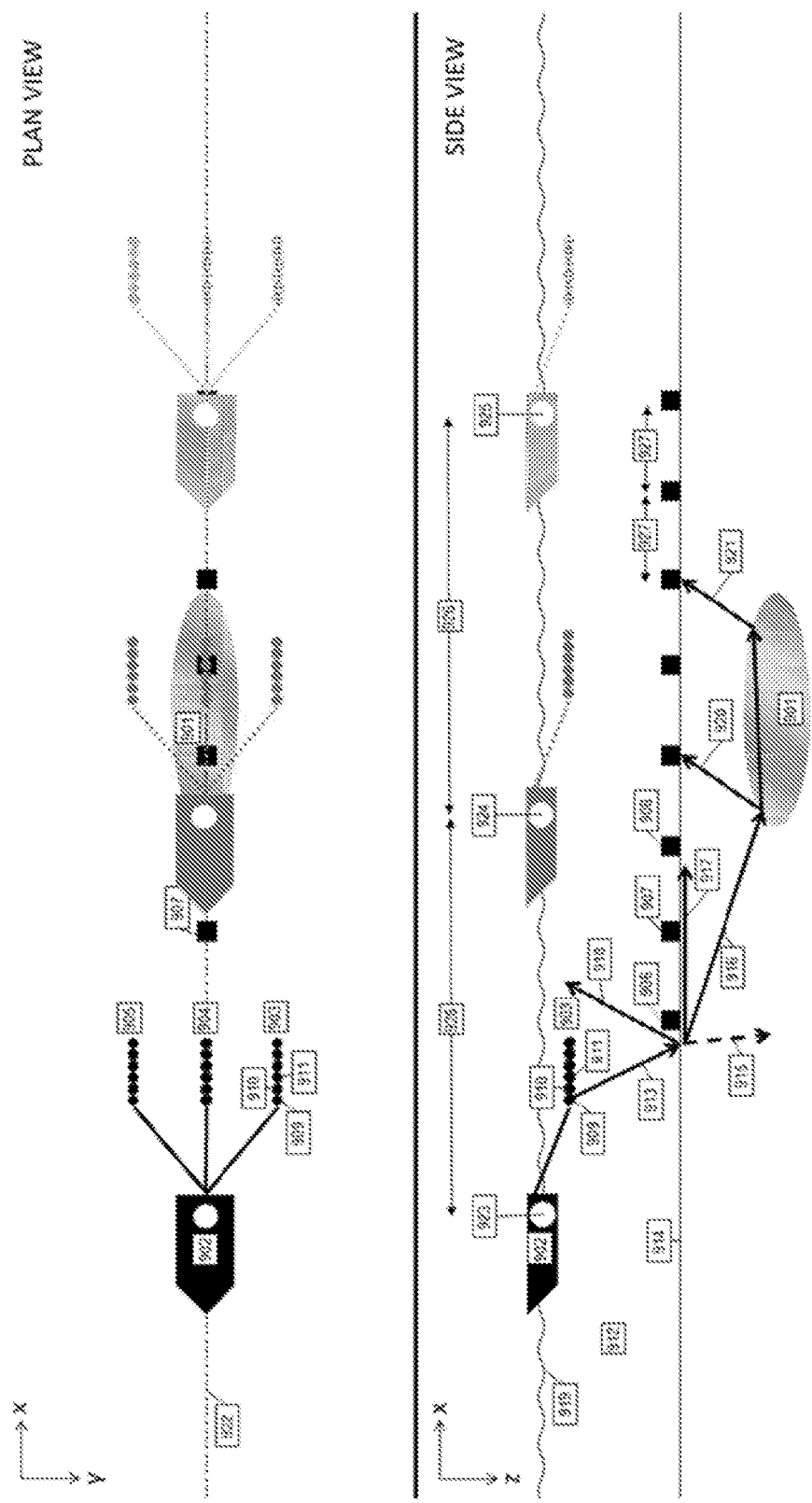
FIG. 9 illustrates the general practice of marine seismic surveying.

FIG. 8(A) illustrates how all signal energy sits inside a "signal cone" centered around k=0 and bounded by the propagation velocity of the recording medium.

It is well known, for example, that due to the "uncertainty principle", a function and its Fourier transform cannot both have bounded support. As (seismic) data are necessarily acquired over a finite spatial (and temporal) extent, the tem "bounded support" and "limited support" or similar used herein are used not in the strict mathematical sense, but rather to describe an "effective numerical support", that can be characterised, e.g., by the (amplitude) spectrum being larger than a certain value. For instance, larger than a certain noise threshold, or larger than the quantization error of the analog-to-digital converters used in the measurement equipment. Further, it is understood that by explicitly windowing space and/or space-time domain data, the support of a function may be spread over a larger region of, e.g., the wavenumber-frequency domain and in such cases the term "bounded support" and "limited support" will also be understood as "effective numerical support" as it will still be possible to apply the methods described herein.

Furthermore, the terms "cone" and "cone-shaped" used herein are used to indicate the shape of the "bounded" or "effective numerical" support of the data of interest (e.g., the data that would be recorded firing the sources individually [i.e. non-simultaneously]) in the frequency-wavenumber domain. In many cases, it will still be possible to apply the methods described herein if the actual support is approximately conic or approximately cone-shaped. For example, at certain frequencies or across certain frequency ranges the support could be locally wider or less wide than strictly defined by a cone. Such variations are contemplated and within the scope of the appended claims. That is, the terms "cone" and "cone-shaped" should be understood to include approximately conic and approximately cone-shaped. In addition, in some cases we use the terms "bounded support" or "limited support" and "effective numerical support" to refer to data with "conic support" or "cone-shaped support" even though in the strict mathematical sense a "cone" is not bounded (as it extends to infinite temporal frequency). In such cases, the "boundedness" should be understood to refer to the support of the data along the wavenumber axis/axes, whereas "conic" refers to the overall shape of the support in the frequency-wavenumber domain.

Furthermore, note that the term "cone-shaped support" or similar refers to the shape of the support of e.g. the data of interest (in the frequency-wavenumber domain), if it were regularly sampled along a linear trajectory in 2D or Cartesian grid in 3D. That is, it refers only to the existence of such a support and not to the actual observed support of the data of interest in the simultaneous source input data or of the separated data of interest sampled as desired. The support of both of these depends on the chosen regularly or irregularly sampled straight or curved input (activation) and output (separation) lines or grids. Such variations are within the scope of the appended claims.

For example consider a case where the input data are acquired using simultaneous curved shot lines. In this case, the methods described herein can either be applied directly to the input data, provided the curvature has not widened the support of the data interest such that it significantly overlaps with itself. In this case, the support used in the methods described herein can be different from cone-shaped. Alternatively, the methods described herein are used to reconstruct the data of interest in a transform domain which corresponds to, e.g., best-fitting regularly sampled and/or straight activation lines or Cartesian grids, followed by computing the separated data of interest in the non-transformed domain at desired regular or irregularly sampled locations.

We begin by assuming the following 3D acquisition geometry for marine seismic data (towed marine, seabed or borehole VSP) with x and y being the horizontal coordinates and z the vertical coordinate. Data are recorded by at least one receiver. A carpet of shot points is acquired where not all sources are activated at the same depth. Preferably (but not necessarily) there should be a regular pattern of the depths of sources between consecutive shot points. For simplicity we will limit the discussion in the following to the case where all even shot points along parallel lines in the x-direction are at one depth below the sea surface $z_1$ and all odd shot points are at a different depth $z_2$, where $z_1 < z_2$ (FIG. 1). If only one shot-line is acquired, the method is of course directly applicable for a 2D source-side deghosting solution.

For simplicity we will also limit the discussion to regularly sampled data in the horizontal plane (i.e., source points are evenly distributed on a Cartesian grid with an equidistant distribution $\Delta x$ in the x-direction and $\Delta y$ in the y-direction). Below we also describe how the method can be generalized to irregularly sampled data in the horizontal plane as well as to cases where the source-depth varies as caused by for instance a rough sea surface. In a separate patent application entitled "Source Separation Method" (Application no. GB1603742.6) by the same applicants and filed in the United Kingdom on 4 Mar. 2016 these aspects are further elaborated on in greater details further demonstrating how to incorporate perturbations in locations and depth for instance into the current disclosure for wave field separation or deghosting and/or redatuming operator estimation. This application is included herein by reference in its entirety.

Figure 2:
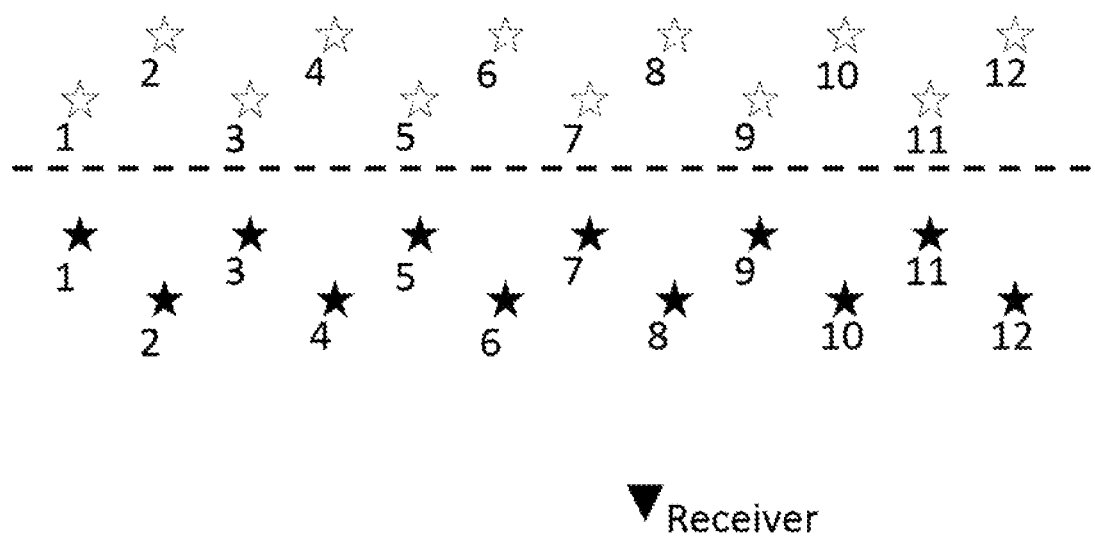
FIG. 2 shows the effect of the source ghost when acquiring a data set as illustrated in FIG. 1 can be thought of as ghost sources (open white stars) excited at mirror locations across the sea surface with opposite polarity compared to the true sources (solid black stars), where the responses due to the open white stars represents the de-ghosted the data on the source side.

FIG. 1 illustrates the acquisition geometry for one of the parallel shot-lines. The number at each shot point shows the number of the shot points. MI shot points are actuated sequentially so that data corresponding to each shot point is acquired independently. The free surface reflector acts as a mirror with negative reflection coefficient. The source ghost can therefore be modelled as virtual ghost sources with opposite polarity mirrored across the sea surface in a situation where the sea surface is removed and replaced with an infinite water layer. This (equivalent) acquisition geometry is illustrated in FIG. 2. Note that now two sources are "activated" simultaneously at each shot point, i.e., both the physical source (solid black) as well as the ghost source (open white) with opposite polarity.

The presence of a non-flat (rough) sea surface can also be addressed using the same mirroring approach. The mirroring can be done assuming that the sea surface is locally flat just in the vicinity of each desired source mirroring the source locations across the local location of the sea surface. This may or may not also include taking the slope of the local sea surface into account. Alternatively, conformal mapping of an arbitrary shaped sea surface can be carried out first. This will shift the locations of the desired physical sources which can then be mirrored across the (now flat) conformally mapped sea surface.

After the acquisition of a carpet of shot points comprising parallel lines of the shot line discussed above, the data can be for example sorted into common receiver gathers, which is a well-known method of representing the results of seismic wave field recordings.

Going back to FIG. 2 and the view of this as a simultaneous source acquisition in an infinite water layer we note that all energy emitted from the virtual and physical sources that interacts with the sub-surface is down-going and that we therefore can use redatuming extrapolation operators on these wave fields to relate the different source levels to each other. A redatum extrapolation operator is an operator that when applied to recorded wave field data propagates the wave field over a distance defined by the operator. Such operators are well known in the industry and examples are described below.

The line of ghost sources (open white stars in FIG. 2) with alternating depths can be thought of as being constructed from ghost sources at a uniform distance from the original sea surface location ($-z_1$, i.e., the level closest to the original sea surface location) through the convolution of a modulation function:

$$\tilde{p}^g(n_x,n_y) = m_1(n_x,n_y) * p^g(n_x,n_y), \qquad (1)$$

where the lower case variables denote expressions in the time space domain, $n_x$ is the shot number (spaced uniformly along a line) in the x-direction and $n_y$ is the number of the parallel shot-line and $m_1(n_x,n_y)$ is the modulating function:

$$m_1(n_x,n_y) = \tfrac{1}{2}[1+(-1)^{n_x}] + \tfrac{1}{2}a^{-1}[1-(-1)^{n_x}] = \tfrac{1}{2}[1+e^{i\pi n_x}] + \tfrac{1}{2}a^{-1}[1-e^{i\pi n_x}]. \qquad (2)$$

The function α is a reclaiming operator which is both a temporal and spatial filter [hence the convolution in space in equation (1)], which can be written in the frequency-wavenumber domain as:

$$A(\omega, k_x, k_y) = e^{ik_z \Delta z} = e^{2\pi i \text{sign}(\omega)\sqrt{(\omega/c)^2 - k_x^2 - k_y^2} \Delta z}, \quad (3)$$

where $\Delta z = z_2 - z_1$.

The above equation (3) may be considered as a general example of a possible mathematical description of a redatuming operator, here in the frequency-wavenumber domain. In the frequency-wavenumber domain we obtain the following expression for the ghost wave field using capital letters for the variables in the frequency-wavenumber domain:

$$\tilde{P}^g(\omega, k_x, k_y) = \frac{1}{2}[1 + 1/A(\omega, k_x, k_y)]P^g(\omega, k_x, k_y) + \frac{1}{2}[1 - 1/A(\omega, k_x, k_y)]P^g(\omega, k_x - k_N, k_y), \quad (4)$$

which follows from a standard Fourier transform result (wavenumber shift; Bracewell, 1999).

Equation (4) shows that the data from the (staggered) ghost sources $\tilde{p}^g(n_x, n_y)$ will be mapped or partitioned into two places in the spectral domain. Part of the data will remain in a cone centred around k=0 with the limits of the cone defined by the slowest propagation velocity of the wave field in the medium and part of the data will be mapped or partitioned into a signal cone centered around $k_N$ along the $k_x$-axis with $k_N$ denoting the Nyquist wavenumber representing the sampling frequency of the data. In other words, part of the data will remain at the signal cone centered around k=0 (denoted by H+ in FIG. 8(B)) and part of the data will be mapped to a signal cone centered around $k_N$ (denoted by H−).

The carpet of desired (non-ghost) sources (solid black stars in FIG. 2 shown along a profile in the x-direction) with alternating depths can also be constructed from desired sources at a uniform depth $z_1$ (the level closest to the original sea surface location) through the convolution of another modulation function:

$$\tilde{p}^d(n_x, n_y) = m_2(n_x, n_y) * p^d(n_x, n_y), \quad (5)$$

where $m_2(n_x, n_y)$ is the modulating function:

$$m_2(n_x, n_y) = \frac{1}{2}[1 + (-1)^{n_x}] + \frac{1}{2}a[1 - (-1)^{n_x}] = \frac{1}{2}[1 + e^{i\pi n_x}] + \frac{1}{2}a[1 - e^{i\pi n_x}]. \quad (6)$$

In the frequency-wavenumber domain we therefore obtain the following expression:

$$\tilde{P}^d(\omega, k_x, k_y) = \frac{1}{2}[1 + A(\omega, k_x, k_y)]P^d(\omega, k_x, k_y) + \frac{1}{2}[1 - A(\omega, k_x, k_y)]P^d(\omega, k_x - k_N, k_y). \quad (7)$$

Again, equation (7) shows that the data from the (staggered) desired sources $\tilde{p}^d(n_x, n_y)$ will be mapped or partitioned into two places in the spectral domain. Part of the data will remain at the signal cone centred around k=0 and part of the data will be mapped or partitioned to a signal cone centered around $k_N$ along the $k_x$-axis. In other words, part of the data will remain at the signal cone centered around k=0 (denoted by H+ in FIG. 8(B)) and part of the data will be mapped to a signal cone centered around $k_N$ (denoted by H−).

In a first embodiment we use equations (4) and (7). Equations (4) and (7) tell us what the mix of desired and ghost sources that occur around k=0 (in the following denoted by $F^0$):

$$F^0 = \frac{1}{2}[1 + 1/A]P^g + \frac{1}{2}[1 + A]P^d. \quad (8)$$

In addition, equations (4) and (7) also tell us what the mix of desired and ghost sources that occur around $k_N$ along the $k_x$-axis (in the following denoted by $F^N$):

$$F^N = \frac{1}{2}[1 - 1/A]P^g + \frac{1}{2}[1 - A]P^d. \quad (9)$$

Equations (8) and (9) can be combined to give us an expression of the wave field of interest emitted from the desired source (i.e., the source-side deghosted wave field):

$$P^d = -\frac{(1+A)F^N - (1-A)F^0}{(A - A^{-1})}. \quad (10)$$

Since the operator A is known from equation (3), the deghosted wave field (i.e., the wave field of interest) can be computed explicitly. Note that A can be determined accurately for a 3D acquisition geometry. If the cross-line spacing is coarse or if only a single line of data is acquired, it may be necessary to resort two a 2D approximation of A.

Note that in this embodiment we have not included any information about the reflection coefficient of the surface. This may be particularly advantageous for land surface seismic applications or in marine seismic applications when the sea surface reflection coefficient is unknown (e.g., due to fine scale sea surface scattering).

Furthermore, note that this embodiment only requires information about the relative depth of the sources, i.e., $\Delta z = z_2 - z_1$. Thus, knowledge about the absolute source depths and the distance away from/location of the free surface is not required.

Although in the derivation of various equations above reference was made to a reflecting (e.g., free) surface, an alternative derivation can be made which does not rely on the presence of any free nor reflecting surface. This can be understood from FIG. 1 by regarding that configuration as a special case of a simultaneous source experiment where the amplitude of both sources is periodically modulated using the factor A=0, that is: no shot fired for every second source position, but where the modulation functions of the sources are staggered w.r.t. each other. Using similar principles as described in the above-referenced "Source Separation Method" it is then straightforward to show that this leads to the same equations for deghosting as described above, and therefore that the two derivations are equivalent.

Thus, it should be clear that methods and the embodiments described above, and various of their extensions and implementations described herein are perhaps at least equally well characterised as wave field separation methods (compared to as deghosting methods) as they work in the absence of reflecting (e.g., free) surfaces. In such a case, the distances $z_1$ and $z_2$ can be thought of as distances relative to an arbitrary surface also denoted herein and hereafter as a (virtual) reference surface. Thus, the normal to the reference surface defines the direction along which the distances $z_1$ and $z_2$ are measured. Herein, we also refer to distances in the direction parallel to the reference surface as "lateral" distances or "lateral offsets".

We note that while often it is natural to take the orientation of the reference surface to be horizontal, this is not a limitation of the methods described herein and the reference surface can correspond to an arbitrary dipping surface, including a vertical surface. Furthermore, it is contemplated that in some cases it may be advantageous to take the reference surface non-parallel to a nearby reflecting surface.

In a second embodiment of the disclosure we make use of one more equation that relates the ghost sources to the desired sources:

$$P^d = -CP^g \quad (11)$$

where C is a redatuming operator that depends on the depth of the shallow sources $z_1$ but that is related to the above defined operators A and B and knowledge or assumptions concerning the reflection coefficient of the free surface reflector, e.g. the sea surface, and is −1 in equation (11):

$$C = A^{2z_1/\Delta z}. \quad (12)$$

Equations (4), (7), (11) and (12) therefore allow us to isolate the wave fields due to the (virtual) ghost sources and or the desired (physical) sources separately without knowing the redatuming operators A, B or C. In fact, the system of equations also allows to solve for the redatuming operator itself. Knowledge of such redatuming operators is important in many applications in seismic data processing such as in imaging of seismic data or in removing multiples in the data for instance. In this example, we obtain the following expression for the mix of desired and ghost sources that occur around k=0 (again denoted by $F^0$):

$$F^0 = -\tfrac{1}{2}[1+A^{-1}]A^{-2z_1/\Delta z}P^d + \tfrac{1}{2}[1+A]P^d. \quad (13)$$

The following expression for the mix of desired and ghost sources that occur around $k_N$ along the $k_x$-axis (again denoted by $F^N$):

$$F^N = -\tfrac{1}{2}[1-A^{-1}]A^{-2z_1/\Delta z}P^d + \tfrac{1}{2}[1-A]P^d. \quad (14)$$

Equations (13) and (14) can be solved explicitly or iteratively for arbitrary values of $z_1$ and sources $\Delta z$ such that we no longer need any information about what the redatuming operator looks like and instead can solve for the desired wave field due to the physical sources only, and or the wave field due to the (virtual) ghost sources and or the redatuming operator.

In a first example it is shown how to iteratively solve the following system of equations directly derived from equations (13) and (14):

$$F^0 + F^N = [1 - A^{-2z_1/\Delta z}]P^d. \quad (15)$$

and $$F^0 - F^N = [A^1 - A^{-1-2z_1/\Delta z}]P^d, \quad (16)$$

by using an initial estimate $$A_0 = e^{i\Delta z \sqrt{(\omega/c)^2 - k_z^2}} \quad (17)$$

as the operator A in the iterative scheme. The resulting operator A can be re-used when minimizing the difference between $P^d$ in equations (15) and (16) until the desired degree of accuracy is achieved in estimating A and therefore also computing $P^d$.

Note that equation (17) is a 2D approximation that can help to iteratively estimate an effective operator A that accounts for 3D effects even though the data set has only been acquired along a single shot line.

In the iterative solution described by equations (15), (16) and (17), $F^0$, $F^N$, $z_1$ and $\Delta z$ are all known quantities whereas $P^d$ and A represent the sought after wave field of interest (i.e., the deghosted wave field) and the unknown 2D or 3D redatuming operator, respectively.

A further example of solving equations (15) and (16) explicitly for the redatuming operator and or the ghost wave field and or the desired wave field is demonstrated in the following.

Assume that $F^0, F^N \in \mathbb{C}$ are known, and let $A_1 = A^{z_1/\Delta z}$. It then holds that $$A = A_1^{z_2/z_1 - 1} \text{ and } A^{-1-2z_1/\Delta z} = A_1^{-z_2/z_1 - 1}.$$

This yields the relation $$\begin{cases} F^0 + F^N = (1 - A_1^{-2})P^d \\ F^0 - F^N = (A_1^{z_2/z_1} - A_1^{-z_2/z_1})A_1^{-1}P^d. \end{cases}$$

By rearranging terms we obtain $$(F^0 + F^N)A_1^2 + (1 - A_1^2)P^d = 0 \quad (18)$$

$$(F^0 - F^N)A_1^{1+z_2/z_1 - 1} + (1 - A_1^{2z_2/z_1})P^d = 0. \quad (19)$$

Let us assume that there is a rational representation $$\frac{z_2}{z_1} = \frac{q}{r},$$

and that $$|A| = 1.$$

We introduce $$a^r = A. \quad (20)$$

This allows us to rewrite (18) and (19) as $$(F^0 + F^N)a^{2r} + (1 - a^{2r})P^d = 0 \quad (21)$$

$$(F^0 - F^N)a^{r+q} + (1 - a^{2q})P^d = 0. \quad (22)$$

This is now a system of polynomials in the unknown variables $P^d$ and a.

A condition for a solution of (21) and (22) is that it holds for the Sylvester matrix (with respect to $P^d$)

$$S = \begin{pmatrix} (1 - a^{2r}) & (F^0 + F^N)a^{2r} \\ (1 - a^{2q}) & (F^0 - F^N)a^{r+q} \end{pmatrix}$$

that its determinant is equal to zero. This gives the condition $$\det(S) = (F^0 - F^N)(a^{r+q} - a^{3r+q}) - (F^0 + F^N)(a^{2r} - a^{2r+2q}) = 0 \quad (23)$$

that a has to satisfy in order for (21) and (22) to have a solution.

To simplify this expression, note that $$b = \frac{F^N - F^0}{F^0 + F^N} = \frac{A^{z_2/z_1} - \bar{A}^{z_2/z_1}}{A - \bar{A}}$$

is real since both the nominator and the denominator become purely imaginary. Hence, it is possible to rewrite (23) as $$Q(a)=ba^{q+2r}-a^{2q+r}-ba^q+a^r=0. \quad (24)$$

by division by $-(F^0+F^N)a^r$.

Candidates for the values of A can thus be obtained by solving (20) and (24). False solutions can be discarded by requiring that the solutions are on the unit circle, and by verifying that equations (21) and (22) are solvable for the obtained values of a. Finally, the solutions will come in complex valued pairs, and the correct value can be determined by the sign of the imaginary part of the logarithm of A (determining the up/down propagation direction).

We note that if the wave fields contain no ghosts or if the ghost wave field is known then equations (8) or (9) or equivalently equations (15) or (16) can be used to estimate the redatuming operator that can then be used for instance in an imaging or a multiple attenuation scheme. This problem reduces to as little as one equation with one unknown.

We note that for the general 3D case by acquiring a carpet of sources with source depths in a checkerboard pattern, as before part of the acquired data will remain at the signal cone centred around k=0 and part of the data will be mapped or partitioned to a signal cone centered around $k_N$ along both the $k_x$ and $k_y$-axes. This separates the data further away in the $k_xk_y$ plane compared to the in the acquisition geometry described above. The two signal cones will therefore only start interfering for higher frequencies making in turn a solution more accurate compared to the 2D case.

In a 2D acquisition geometry we can also brace the line with nearby shots such that the source-side cross-line derivative of the wave field can be estimated. This information can be used to estimate the directionality of the wave field. Again, once we know the directionality of the wave field in 3D we can use this information gained from a single 2D shot-line to 3D deghost the data.

Figure 7:
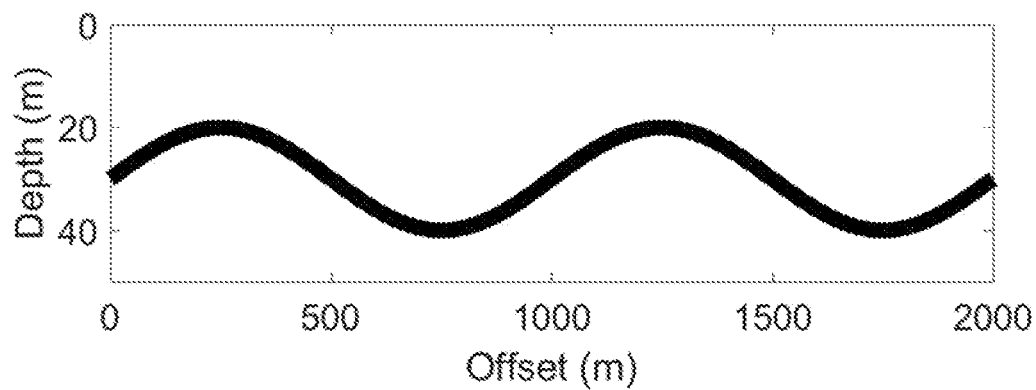
FIG. 7 shows an example of a single marine seismic streamer towing profile that may be used to acquire data that can be de-ghosted using the present disclosure applied to remove the receiver-side ghost.

The methods described here can also be applied on the receiver side for receiver-side deghosting (a direct consequence of source-receiver reciprocity). For instance, an over/under streamer geometry can be used to have receivers at alternating depths. Alternatively, data acquired using a streamer towed at a non-uniform depth as for instance illustrated in FIG. 7 can be deghosted on the receiver-side using the present disclosure.

Synthetic data were computed using a finite-difference solution of the wave equation for a typical North Sea subsurface velocity and density model consisting of sub horizontal sediment layers overlying rotated fault blocks. The model is invariant in the cross-line direction and we therefore illustrate the result for a common-receiver gather of one line of shots only.

Figure 3:
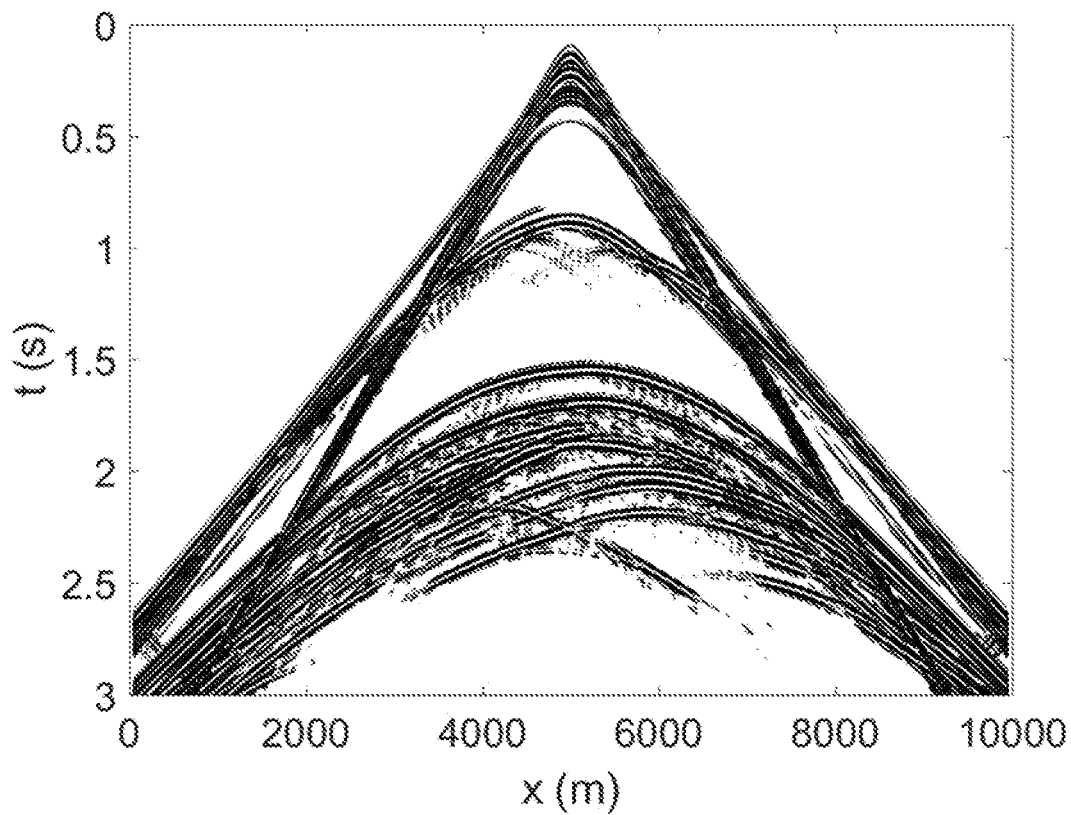
FIG. 3 shows the modelled seismic waveform data for a stationary receiver and a line of regularly spaced shots, where two sources at 10 and 15 m depth were fired alternately.
Figure 4:
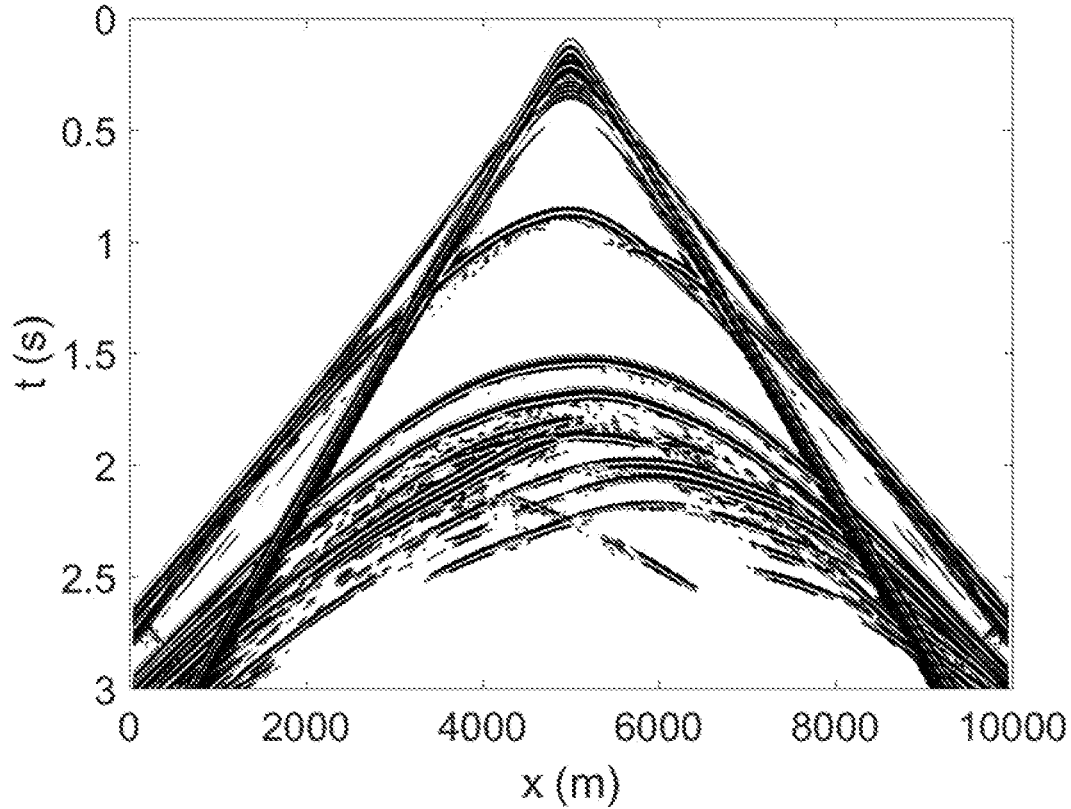
FIG. 4 shows the source-side de-ghosted result representing the upgoing waves at 15 m depth.
Figure 5:
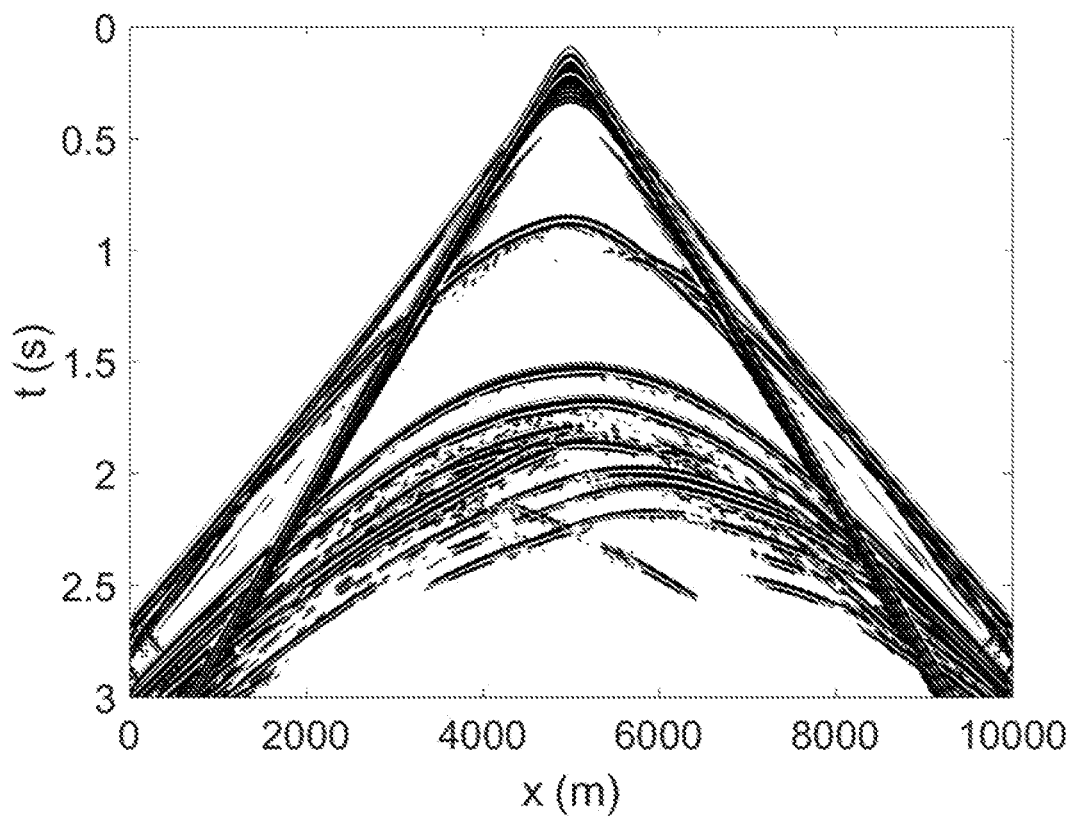
FIG. 5 shows the reference upgoing wave data at 15 m depth.
Figure 6:
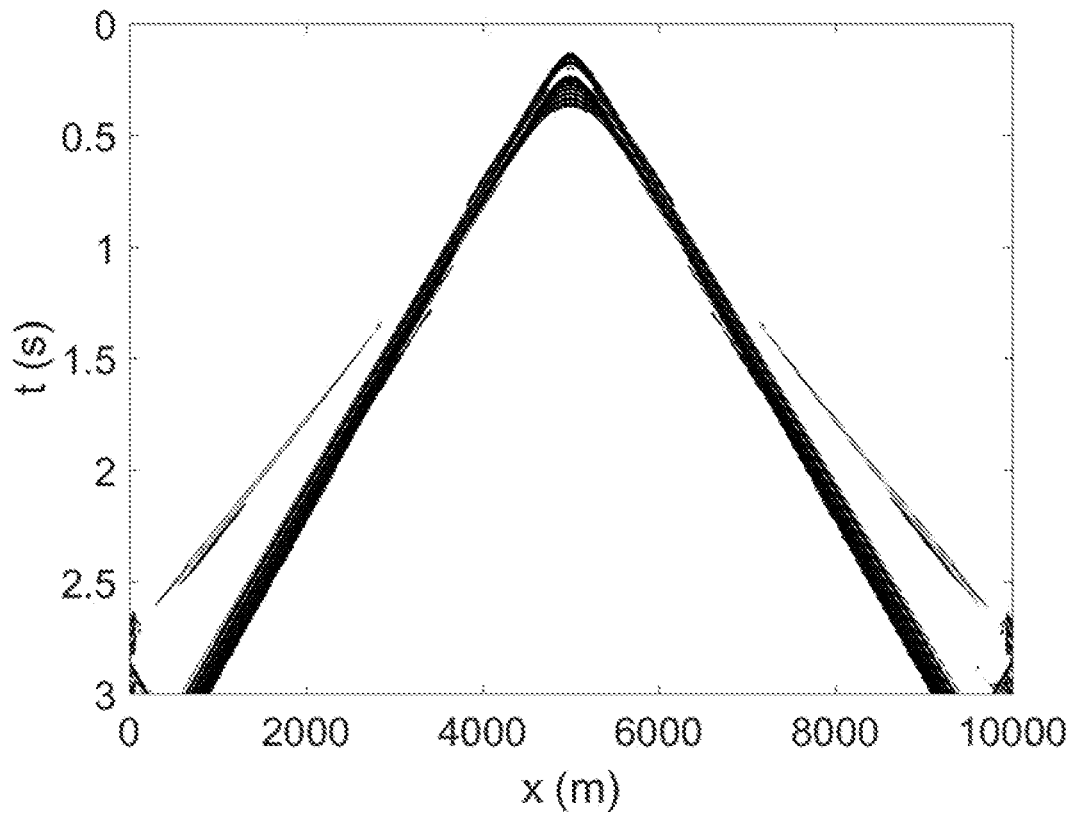
FIG. 6 shows the difference between the reconstructed upgoing waves at 15 m shown in FIG. 4 and the separately modelled upgoing waves at 15 m (i.e. reference solution) in FIG. 5.

The data consist of the waveforms recorded at a single stationary receiver (located on the seafloor) for a line of regularly spaced shots, where two sources at $z_1=10$ m and $z_2=15$ m depth are fired alternately as illustrated in FIG. 1. The data, which include source- and receiver-side ghost reflections from the free surface (located at z=0 m) as illustrated by FIG. 2, are shown in FIG. 3. We then apply our source-side deghosting technique [by means of the first described embodiment of the method using equation (10)] to separate the ghost sources from the physical sources. The result is shown in FIG. 4. The separately modelled upgoing wave data at 15 m depth (i.e. a reference solution) is shown in FIG. 5. The difference is shown in FIG. 6. Note that besides the horizontally propagating direct waves and some steeply dipping artefacts (due to imperfect redatuming for such waves) the separation performed in accordance with the example above can be considered as being very accurate.

In the above we have focused the description on a particular type of modulation function where all source and or receiver locations are equidistant along a horizontal line and that only two source and or receiver depths exist along the line of recorded data; every second location corresponds to a source or a receiver at the one depth whereas the locations in between correspond to a source or a receiver at the other depth. Equations (2) and (6) show modulation functions corresponding to this case and as shown they map into signal cones centered at wavenumber k=0 as well as wavenumber $k=k_N$. For other modulation functions, the signal cones can be mapped into other places.

For example, it is straightforward to show that the case where there are two consecutive locations along a line at one depth followed by two consecutive locations at a second depth and then again followed by two consecutive locations at the first depth, etc., will result in the wave field signals being mapped into three locations. In addition to the signal cone centered at wavenumber k=0, there will also be second and third signal cones centered at $k=\pm k_N/2$. In principle this adds potentially new information and equations to further constrain the computation of the desired wave field of interest, the ghost wave field and or the redatuming operator.

Furthermore, the method described herein can be generalized to irregularly sampled data in the horizontal plane as well as to the case where the source-depth varies as caused by for instance a rough sea surface. This process is described in the following as well as illustrating how the corresponding system of equations can be solved. For the general case with perturbed locations and depths, the wave fields can be partitioned or mapped into a much larger number of locations (in general as many locations as there are locations in the gather of data).

In the description so far we have assumed that data are sampled spatially at equally spaced points. This is a preferable setup, but similar results can be obtained if the sampling is deviating from this setup. We briefly outline how this can be achieved.

Assume as before that $p^d$ and $p^g$ are bandlimited in such a way that the signal cones at k=0 and k=N do not overlap. For counterparts of (8) and (9) to hold, we need to recover the two data cones. Let $m_1$ be defined by (2) as before, but now allow the samples $\{x_{n_x}\}$ to be unequally spaced. For the discrete evaluation of the application of $m_1$ in the case of equally spaced sampling, the Fourier transform of for instance $m_1*p$ could be evaluated using regular FFT operations. Hence, the sought for data in the two signal cones could be acquired directly from $$\mathcal{F}(m_1*p)(\omega,k_x,k_y)=\tfrac{1}{2}[1+A(\omega,k_x,k_y)]P(\omega,k_x,k_y)+\tfrac{1}{2}[1-A(\omega,k_x,k_y)]P(\omega,k_x-k_N,k_y). \quad (25)$$

Above, $\mathcal{F}$ represents a regular discrete Fourier matrix containing elements of the form $$e^{-2\pi i k_t \Delta_\omega n_t \Delta t} e^{-2\pi i k_x \Delta\eta n_y \Delta_y} e^{-2\pi i k_x \Delta\zeta n_x \Delta_x}.$$

For the case of unequally spaced sampling in x, the last factor will be changed into $$e^{-2\pi i k_x \Delta \xi x_{n_x}}$$

and an additional quadrature weight w represented as a diagonal matrix we be needed to obtain accurate approximations of (25).

However, the unequally spaced sampling will perturb the result (25). Usually the quadrature weight is chosen so that to obtain accurate results around the central cone, but with a loss of accuracy at for higher frequencies. This should, however not seriously limit the ability to obtain the data from the two data cones; but it is preferable to use two different sets of quadrature weights—one for each cone.

Let us introduce the shift operator $(S_N P)(\omega,k_x,k_y)=P(\omega, k_x-k_N,k_y)$. We can then rewrite (25) as $$\mathcal{F}_{(m_1 * p)} = \mathcal{D} P + \varepsilon P,$$

where $$\mathcal{D} = [1+A(\omega,k_x,k_y)] \text{ and } \varepsilon = \tfrac{1}{2}[1-A(\omega,k_x,k_y)]S_N,$$

are linear operators realized in terms of Fourier multipliers.

As discussed above, by using properly chosen quadrature rules the action of these operators may be approximated using finite dimensional counterpart that employs the given sampling points $\{x_{n_z}\}$. The unequally spaced sampling will make the Fourier inversion procedure different than in the case of equally spaced sampling where the inverse and the adjoint coincide. The inverse is generally computationally expensive to represent directly, and instead the inversion is computed by using an iterative procedure. In this way the distortion of the unequally spaced sampling can be suppressed as long as the sampling is moderately distorted in such a way that the signal cones can still be kept separated.

Amplitude and signature perturbations are easily accounted for as both the source and the ghost are exposed for the same distortion. The corrections can therefore be applied directly to the data.

We now turn our focus to the case where the depth is varying, i.e., how to accommodate for variations of the sources vertical coordinate which might change if the sea surface changes even though the source is at the same distance below the sea surface.

Let c denote the homogenous wavespeed and let $$B = \left\{(\omega, k_x) : \frac{\omega^2}{c^2} - k_x^2 > 0, \omega < 0\right\}.$$

Suppose that we are given a continuous wave field $f$ with supp $\hat{f} \subset B$ sampled spatially at points $\{(x_{n_x}, y_{n_y})\}_{n_x,n_y}$ and constant depth $z_0$.

A redatumed wave field g can be sampled using new generic depth coordinates $\zeta = \{\zeta_{n_x,n_y}\}_{n_x,n_y}$ by
1. Compute a (discrete) Fourier transform $\hat{f}$ using the samples of $f$.
2. Apply the redatum operator by applying the (discrete counterpart of) Fourier integral operator $$g(t, x_n, y_{n_y}) = \frac{1}{\sqrt{2}(\pi)^{3/2}} Re$$

$$\iint\int_B e^{-i\sqrt{(\omega/c)^2 - k_x^2 - k_y^2} \zeta_j + i(\omega t + k_x x_{n_z} + k_y y_{n_y})} \hat{f}(\omega, k_x, k_y) d\omega dk_x dk_y.$$

The action of a can then be obtained from the relation $$af(t, x, y) = \frac{1}{\sqrt{2}(\pi)^{3/2}} Re \iint\int_B \hat{f}(\omega, k_x, k_y) A(\omega, k_x, k_y) e^{i(t\omega + xk_x + yk_y)} d\omega dk_x dk_y.$$

This procedure defines a linear map $\mathcal{R}_\zeta$ and we can write $g = \mathcal{R}_\zeta f$. Suppose that we are given a wave field $g_1$ that is recorded at depths $\zeta^1$ and we seek for the counterpart $g_2$ that would have been recorded at depths $\zeta^2$. This can be computed by $$g_2 = \mathcal{R}_{\zeta^2}(\mathcal{R}_{\zeta^1}^{-1} g_1),$$

which can be practically realized by using iterative solvers given that computational routines are available for the application of the $\mathcal{R}_{\zeta^1}$ and its adjoint $\mathcal{R}_{\zeta^2}$. However, this computational procedure simplifies substantially in the case when the set of points $\zeta^1$ and $\zeta^2$ are constant, since in this case the part.

The expression $$e^{-i\sqrt{(\omega/c)^2 - k_x^2 - k_y^2}\, \zeta_j}$$

becomes independent of the output parameters, and the whole procedure can be applied by FFT operations.

During the last decade, progress has been made concerning computational routines for fast application of Fourier integral operators that have the same complexity as regular FFT (but with worse computational constants) see O'Neil et al. (2007) and Candes et al. (2009). Using such routines will allow for the treatment of varying depths in the redatuming operators, and hence the treatment of the source deghosting methods for variable depths along the lines previously described.

A simpler generalization concerns the case where the depth varies smoothly enough so that the depths can be considered to be approximately constant in spatially local neighborhoods. In this case we can choose localization functions $\{\phi_m(x,y)\}_m$ and replace $\tilde{p}^g$ and $\tilde{p}^d$ in (1) and (5) with $\phi_m \tilde{p}^g$ and $\phi_m \tilde{p}^d$ and repeat the previous procedure for deghosting for these localized versions.

Next we consider the case of regularization of the estimated redatum operator. Suppose now that measurements of $f$ are conducted along a line, say in the x-direction. This implies that the y-component in (3) can not be readily obtained. Under the assumption that $f$ is constant in the y-direction, the deghosting can be achieved using $$A_0 = e^{i\sqrt{\frac{\omega^2}{c^2} - k_x^2}\, \Delta z},$$

instead of A in (8-10).

In contrast, equation (11) in the second embodiment allows for the computation of the redatum operator for individual frequencies $\omega$ and $k_x$ alone. To accurately recover the redated versions of $f$ some additional implicit conditions on its structure concerning the variation in the y-direction needs to be satisfied. For this reason, and for the reason of stability, it is desirable to regularize the estimated redatum operators. We shall see that a natural regularization constraint would be to locally require that is that locally, in a region that is localized by some function $\phi_m$, there is a constant $\beta_m$ such that there is a function $\tilde{f}_m$ such that $\hat{f}_m(\omega,k_x,k_y)$ has support on the manifold $$\mathcal{M} = \left\{\omega, k_x, k_y : k_y^2 = \beta_m\left(\frac{\omega^2}{c^2} - k_x^2\right), (\omega, k_x) \in B\right\}$$

and that $$(\phi_m f)(t, x) = \phi_m(t, x) \frac{1}{\sqrt{2}(\pi)^{3/2}} Re \int\int\int_{\mathcal{M}} \hat{f}_m(\omega, k_x, k_y) e^{i(t\omega + xk_x + yk_y)} d\omega dk_x dk_y.$$

For the redatum version it should thus hold that $$\phi_m \mathcal{R}_\zeta f(t, x) = \phi_m(t, x) \frac{1}{\sqrt{2}(\pi)^{3/2}} Re \int\int\int_{\mathcal{M}} \hat{f}_m(\omega, k_x, k_y) e^{i\left(\sqrt{\frac{\omega^2}{c^2} - k_x^2 - k_y^2}\zeta + t\omega + xk_x + yk_y\right)} d\omega dk_x dk_y.$$

For the estimated redatum operator $$A^\zeta = A^{2\frac{z_1}{\Delta z}} = e^{i\varphi(\omega, k_x)\zeta},$$

we use the notation $$\phi_m \mathcal{R}_\zeta^e f(t, x) = \phi_m(t, x) \frac{1}{\sqrt{2}(\pi)^{3/2}} Re \int\int\int_{\mathcal{M}} \hat{f}_m(\omega, k_x) e^{i(\varphi + t\omega + xk_x)} d\omega dk_x,$$

For the regularization of $\mathcal{R}_\zeta^e$, we now make the approximation $$e^{i\sqrt{\frac{\omega^2}{c^2} - k_x^2 - k_y^2}\zeta} = e^{i\sqrt{\frac{\omega^2}{c^2} - k_x^2}\left(\sqrt{1 - \frac{k_y^2}{\frac{\omega^2}{c^2} - k_x^2}}\right)\zeta} \approx e^{i\sqrt{\frac{\omega^2}{c^2} - k_x^2}\left(1 - \frac{1}{2}\frac{k_y^2}{\frac{\omega^2}{c^2} - k_x^2}\right)\zeta}.$$

Given the assumption of support on the manifold $\mathcal{M}$ we then obtain that $$\phi_m \mathcal{R}_\zeta f(t, x) \approx$$

$$\phi_m(t, x) \frac{1}{\sqrt{2}(\pi)^{3/2}} Re \int\int_B \left( \hat{f}_m\left(\omega, k_x, \sqrt{\beta_m}\sqrt{\frac{\omega^2}{c^2} - k_x^2}\right) + \hat{f}_m\left(\omega, k_x, -\sqrt{\beta_m}\sqrt{\frac{\omega^2}{c^2} - k_x^2}\right)\right) \times \times$$

$$e^{i\left(\sqrt{\frac{\omega^2}{c^2} - k_x^2}\left(1 - \frac{\beta_m}{2}\right)\zeta + t\omega + xk_x + yk_y\right)} d\omega dk_x dk_y \approx \phi_m(t, x)$$

$$\frac{1}{\sqrt{2}(\pi)^{3/2}} Re \int\int_B \hat{f}(\omega, k_x) e^{i\left(\sqrt{\frac{\omega^2}{c^2} - k_x^2}\left(1 - \frac{\beta_m}{2}\right)\zeta + t\omega + xk_x + yk_y\right)}$$

$$d\omega dk_x dk_y \stackrel{def}{=} \phi_m \mathcal{R}^{\beta_m}_\zeta f(t, x).$$

We would now like to find the value of $\beta_m$ that minimizes $$\|\phi_m \mathcal{R}^{\beta_m}_\zeta f(t,x) - \phi_m \mathcal{R}_\zeta^e f(t,x)\|,$$

which is equivalent to minimizing $$\int\int_B \left|\phi_m * \left(\hat{f}(\omega, k_x)\left(A^{-\frac{\zeta}{\Delta z}\left(1 - \frac{\beta_m}{2}\right)}_0 - e^{i\varphi(\omega, k_z)\zeta}\right)\right)\right|^2 d\omega dk_x.$$

Now, since $\beta_m$ is a scalar value, we can compute the derivative of the above expression with respect to $\beta_m$, and from there obtain the optimal estimate.

Given the estimated values of $\beta_m$ that obtain implicitly information about the cross-line (y) derivative of the measured wave field, despite the fact that measurements are only conducted in the in-line direction (x). This knowledge, along with the estimation of the redatum operator itself, allows for full 3d deghosting, including the crossline deghosting.

In the following we describe a second embodiment for 3D deghosting of 2D data, also referred to as crossline deghosting, which comprises a Fourier-domain planar support assumption and which also addresses, without loss of generality, the special case where the depth of the second source (receiver) equals twice the depth of the first source (receiver), i.e., $z_2 = 2z_1$.

First we briefly discuss Fourier-domain planar support and introduce some related notation. Let us assume that $f(t,x,y)$ is (locally) such that its Fourier transform has support on a plane $$k_y = \alpha\omega + \beta k_x. \quad (26)$$

This means that $$f(t,x,y) = \int_{-\infty}^{\infty}\int_{-\infty}^{\infty}\int_{-\infty}^{\infty} F(\omega, k_x, k_y) e^{2\pi i(t\omega + xk_x + yk_y)} d\omega dk_x dk_y \int_{-\infty}^{\infty}\int_{-\infty}^{\infty}\int_{-\infty}^{\infty} F(\omega, k_x, k_y) e^{2\pi i(t\omega + xk_x + yk_y)} \delta(k_y - \alpha\omega - \beta k_x) d\omega dk_x dk_y \int_{-\infty}^{\infty}\int_{-\infty}^{\infty} F(\omega, k_x) e^{2\pi iy(\alpha\omega + \beta k_x)} e^{2\pi i(t\omega + xk_x)} d\omega dk_x,$$

where $$F(\omega, k_x) = \int_{-\infty}^{\infty} F(\omega, k_x, k_y) dk_y.$$

For fixed y, let $$f_y(t,x) = f(t,x,y),$$

and let $$\hat{f}_y(\omega, k_x) = \int_{-\infty}^{\infty}\int_{-\infty}^{\infty} f_y(t,x) e^{-2\pi i(t\omega + xk_x)} dt dx.$$

Since the Fourier transform is unitary, it now follows that $$\hat{f}_y(\omega, k_x) = F(\omega, k_x) e^{2\pi iy(\alpha\omega + \beta k_x)}. \quad (27)$$

Hence, it is sufficient to know $f_y(t,x)$ along with $\alpha$ and $\beta$ to recover F if the support of F is given by (26).

Next, we continue by deriving the pointwise equations, in the frequency wavenumber domain, for source (receiver) deghosting. Let us start, without loss of generality, with considering the case where $$z_2 = 2z_1.$$

Let $A_1$ and $A_2$ be the redatuming operators $$A_1 = e^{2\pi i \operatorname{sign}(\omega) k_z z_1}, \text{ and}$$

$$A_2 = e^{2\pi i \operatorname{sign}(\omega) k_z z_2}, \text{ where}$$

$$k_z = \begin{cases} \sqrt{\left(\frac{\omega}{c}\right)^2 - k_x^2 - k_y^2}, & \text{if } \left(\frac{\omega}{c}\right)^2 > k_x^2 + k_y^2 \\ 0, & \text{otherwise} \end{cases}$$

Note that $A_2 = A_1^2$.

Let $d_{1d}$ be the direct wave for the first depth, and $d_{1g}$ be the corresponding ghost, and assume full three-dimensional sampling. Define $d_{2d}$ and $d_{2g}$ in a similar fashion. It is now possible to express the ghost at the first depth as well as the direct wave and the ghost for the second depth in terms of the direct wave for the first depth as $$\begin{cases} d_{1g} = \mathcal{F}^{-1}(\overline{A_1}^2 \mathcal{F}(d_{1d})), \\ d_{2d} = \mathcal{F}^{-1}(\overline{A_1} A_2 \mathcal{F}(d_{1d})), \\ d_{2g} = \mathcal{F}^{-1}(\overline{A_1 A_2} \mathcal{F}(d_{1d})). \end{cases}$$

Let $d_1 = d_{1d} - d_{1g}$ and $d_2 = d_{2d} - d_{2g}$ and d be the apparated version with even traces containing $d_1$ and odd traces containing $d_2$. It then holds that $$F_0 = (D_1 + D_2)/2 = ((1 - \overline{A_1}^2) + (\overline{A_1} A_2 - \overline{A_1 A_2})) D_1/2,$$

and $$F_N = (D_1 - D_2)/2 = ((1 - \overline{A_1}^2) - (\overline{A_1} A_2 - \overline{A_1 A_2})) D_1/2,$$

and hence that $$F_0 + F_N = (1 - \overline{A_1}^2) D_1 = (A_1 - \overline{A_1}) \overline{A_1} D_1,$$

and $$F_0 - F_N = (A_2 - \overline{A_2}) \overline{A_1} D_1.$$

This in turn implies that $$\frac{F^0 - F^N}{F^0 + F^N} = \frac{(A_2 - \overline{A_2})}{(A_1 - \overline{A_1})} = \frac{(A_1^2 - \overline{A_1}^2)}{(A_1 - \overline{A_1})} = \frac{(A_1 - \overline{A_1})(A_1 + \overline{A_1})}{(A_1 - \overline{A_1})} \quad (28)$$

$$= 2\cos(2\pi i \operatorname{sign}(\omega) k_z z_1)$$

Next, suppose that sampling is only available at a fixed value of y, but that $D_1$ satisfy the support constraint (26). Let $$\hat{d}_y(\omega, k_x) = \int_{-\infty}^{\infty} \int_{-\infty}^{\infty} d_y(t, x) e^{-2\pi i (t\omega + x k_x)} dt dx,$$

For values of $\omega$ and $k_x$ inside the central lozenge/diamond shape region (FIG. 8B), it follows from (27) that $$\hat{d}_y(\omega, k_x) = \hat{f}^0(\omega, k_x)$$

$$= \int_{-\infty}^{\infty} ((1 - \overline{A_1}^2) + (\overline{A_1} A_2 - \overline{A_1 A_2}))$$

$$(\omega, k_x, k_y) \frac{1}{2} D_1(\omega, k_x, k_y) dy e^{2\pi i y(\alpha\omega + \beta k_x)},$$

$$= ((1 - \overline{A_1}^2) + (\overline{A_1} A_2 - \overline{A_1 A_2}))$$

$$(\omega, k_x, \alpha\omega + \beta k_x) \frac{1}{2 D_1}$$

$$(\omega, k_x) e^{2\pi i y(\alpha\omega + \beta k_x)}.$$

Similarly, we get that $$\hat{f}^N(\omega, k_x) = (((1 - \overline{A_1}^2) - (\overline{A_1} A_2 - \overline{A_1 A_2})))(\omega, k_x, \alpha\omega + \beta k_x) \frac{1}{2} D_1(\omega, k_x) e^{2\pi i y(\alpha\omega + \beta k_x)}.$$

From (28) it now follows that $$\frac{f^0 - f^N}{f^0 + f^N}(\omega, k_x) = \frac{((A_2 - \overline{A_2}) \overline{A_1})(\omega, k_x, \alpha\omega + \beta k_x)_{D_1}(\omega, k_x)}{((A_1 - \overline{A_1}) \overline{A_1})(\omega, k_x, \alpha\omega + \beta k_x)_{D_1}(\omega, k_x)} (A_1 + \overline{A_1})(\omega, k_x, \alpha\omega + \beta k_x)$$

$$= 2\cos\left(2\pi i \operatorname{sign}(\omega) z_1 \sqrt{\left(\frac{\omega}{c}\right)^2 - k_x^2 - (\alpha\omega + \beta k_x)^2}\right)$$

For valid values of $\omega$ and $k_x$ we can now estimate the parameters $\alpha$ and $\beta$ using the relationship above. A crude way of doing this is to compute $$s(\omega, k_x) = \arccos\left(\frac{f^0 - f^N}{f^0 + f^N}(\omega, k_x)\right) / (2\pi i \operatorname{sign}(\omega))$$

and then estimate $\alpha$ and $\beta$ by from the relationship $$s^2 - \left(\frac{\omega}{c}\right)^2 + k_x^2 = \alpha^2 \omega^2 + 2\alpha\beta\omega k_x + \beta^2 k_x^2.$$

For this to work, it is required that $k_z z_1$ is small enough to avoid phase wrapping effect, or to employ some phase unwrapping method.

A more refined approach would be to make use of multi-dimensional frequency estimation methods for general domains. This concludes the description of a second embodiment for 3D deghosting of 2D data. A further, general embodiment of the methods described herein comprises the use of so-called tuned source arrays which consist of at least two sources or source arrays towed at at least two different depths which are fired with small time delays/advances relative to each other. It is well known in the art that by appropriately choosing the small time delays/advances it is possible to create a situation where the downgoing wave field from one or more of the upper sources/source arrays reinforces the downgoing wave field of one or more of the lower sources/source arrays whereas the upgoing wave fields of the at least two sources/source arrays at different depths interfere non-constructively. Thus, the source-side ghost reflection is attenuated (but not eliminated) relative to the direct downgoing source wave field for such a composite source (Hopperstad et al., 2008a, 2008b; Halliday, 2013).

Similarly, it is possible to choose the small time delays/advances for such a tuned source array such that the upgoing wave field from one or more of the lower sources/source arrays reinforces the upgoing wave field from one or more of the upper sources/source arrays whereas the direct downgoing waves from the at least two sources/source arrays at different depths interfere non-constructively.

Figure 10:
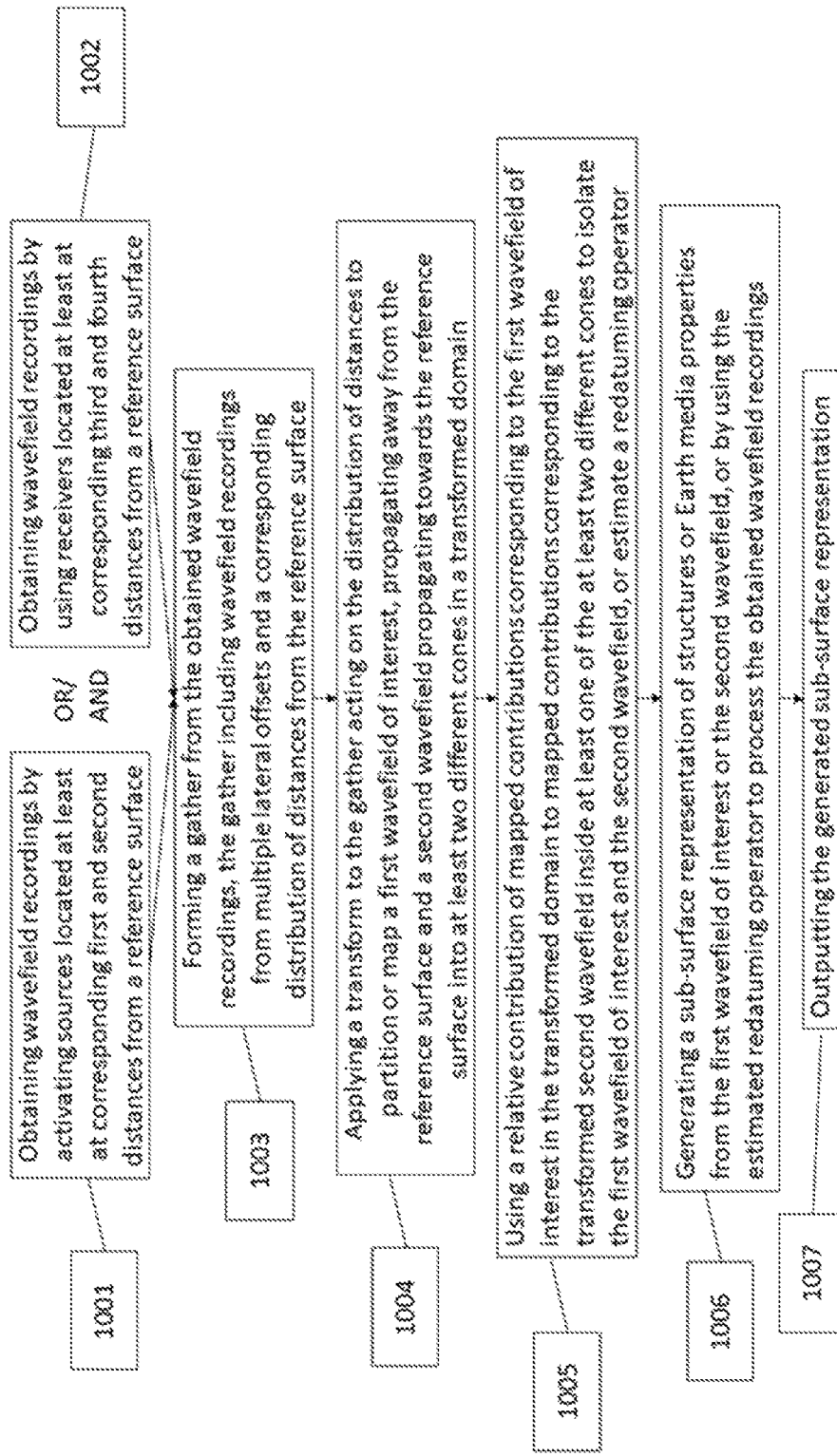
FIG. 10 summarizes key steps in the methods proposed herein in a flowchart.

The various steps in the methods described herein are summarised with reference to the flowchart in FIG. 10. In a first step, wave field recordings are obtained by activating physical sources located at least at two different distances from a reference surface (1001), or/and using receivers located at least at two different distances (not necessarily the same as the distances used for the sources) from a reference surface (1002). In a second step, 1003, one or more gathers are formed from the obtained wave field recordings, a gather including wave field recordings from multiple lateral offsets and a corresponding distribution of distances from the reference surface. In a third step, 1004, a transform is applied to the gather which thus acts on the distribution of distances as expressed in the data, to partition or map a first wave field of interest, propagating away from the reference surface and a second wave field propagating towards the reference surface into at least two different cones in a transformed domain. In a fourth step, 1005, a relative contribution of mapped contributions corresponding to the first wave field of interest in the transformed domain to mapped contributions corresponding to the transformed second wave field inside at least one of the at least two different cones is used to isolate the first wave field of interest and the second wave field, or estimate a redatuming operator. In a fifth step, 1006, sub-surface representation of structures or Earth media properties are generated from the first wave field of interest or the second wave field, or by using the estimated redatuming operator to process the obtained wave field recordings. Finally, in a sixth step, 1007, the generated sub-surface representation is output on screen or disk or other permanent or non-permanent recording medium.

An alternative general embodiment of the methods described herein comprising the use of at least two tuned source arrays then consists of tuning at least one of the source arrays such that, e.g., the downgoing wave field is reinforced while also tuning at least one of the remaining source arrays such that the upgoing wave field is reinforced. By periodically varying the use of the upgoing-tuned source and the downgoing-tuned source to perform the activation the methods described herein can be employed. This is so because the wave field emitted by the upgoing-tuned source is to a good approximation a time-delayed and inverted copy of the wave field emitted by the downgoing-tuned source. The time delay depends on the (effective) depth of the tuned source arrays, which as an added benefit can be the same for the two or more tuned source arrays.

The methods presented herein rely on periodically varying source activation parameters (or receiver parameters) such as source activation depth (receiver depth) or source tuning direction (i.e., source radiation in the upgoing or downgoing direction). However, it is contemplated and within the scope of the appended claims that further periodic variations in source activation parameters can be applied in conjunction with such variations, including variations in source activation time, source activation signal strength, source activation position, etc., to achieve, for example, joint simultaneous source separation and source deghosting. It should be noted that such further periodic variations do not necessarily apply the same period of variation. Further, it is contemplated that the methods described herein are applied in conjunction with other, non-periodic simultaneous source separation methods to achieve joint simultaneous source separation and source deghosting.

As another example of a method that has been contemplated, which comprises both simultaneous source separation and wave field separation/deghosting, consider the following: a multi-level source comprising at least two sources/source arrays at different levels is encoded using modulation functions such that, e.g., every second of two shot points the shallower source/source array activates a time interval $\Delta t$ earlier than the deeper source/source array, whereas every first of two shot points the deeper source/source array activates a time interval $\Delta t$ earlier than the shallower source/source array. By encoding the simultaneous sources/source arrays in this manner, for example, and by using similar principles as outlined in the previously referenced "Source Separation Method", the two sources/source arrays at different depths can be separated. Furthermore, by appropriately selecting a subset of the separated sources (e.g., such that the source depth varies periodically) we can achieve one or datasets such as depicted in FIG. 1 and thus apply the methods described herein to achieve source wave field separation/deghosting.

Further variations on the example described directly above, e.g., involving sources/source arrays at more than two depths, as well as variations in the (periodic) encoding of the simultaneous sources as well as the subsequent (periodic) selection of a subset of separated sources are contemplated and within the scope of the appended claims.

It is furthermore contemplated that using the methods described herein that the isolated, solved or estimated wave field of interest and the second (ghost) wave field can be used jointly to derive some additional wave field quantities of interest such as: the gradient of the wave field perpendicular to the reference surface or the corresponding component of the particle displacement, velocity or acceleration.

Finally, it is contemplated that, in the case of acquisition of wave field signals during periods with large amplitude water waves on the sea-surface (i.e., under conditions of large significant wave height) that, since the source is buoyed to the reference (sea) surface, one-way shot-to-shot timing variations will be present which manifest themselves through a convolution in the source wavenumber direction of the corresponding flat-sea spectra with the transform of the implied spatial modulation function that is the effective modulation due to the shot-to-shot timing variations. Such timing variations, and thereby to first order the sea surface waveheights, can thus be estimated by modelling and inverting the spreading of the signals partitioned into the at least two cones for the methods described herein.

In addition, we note that it can be advantageous to process and separate local space and/or time domain subsets of data acquired using the methods and principles described herein.

As should be clear to one possessing ordinary skill in the art, the methods described herein apply to different types of wave field signals recorded (simultaneously or non-simultaneously) using different types of sensors, including but not limited to; pressure and/or one or more components of the particle motion vector (where the motion can be: displacement, velocity, or acceleration) associated with compressional waves propagating in acoustic media and/or shear waves in elastic media. When multiple types of wave field signals are recorded simultaneously and are or can be assumed (or processed) to be substantially co-located, we speak of so-called "multi-component" measurements and we may refer to the measurements corresponding to each of the different types as a "component". Examples of multi-component measurements are the pressure and vertical component of particle velocity recorded by an ocean bottom cable or node-based seabed seismic sensor, the crossline and vertical component of particle acceleration recorded in a multi-sensor towed-marine seismic streamer, or the three component acceleration recorded by a microelectromechanical system (MEMS) sensor deployed e.g. in a land seismic survey.

The methods described herein can be applied to each of such measured components independently, or to two or more of such measured components jointly. Joint processing may involve processing vectorial or tensorial quantities representing or derived from the multi-component data and may be advantageous as additional features of the signals can be used in the separation. For example, it is well known in the art that particular combinations of types of measurements enable, by exploiting the physics of wave propagation, processing steps whereby e.g. the multi-component signal is separated, for example on the receiver side, into contributions propagating in different directions (i.e., receiver-side wave field separation), certain spurious reflected waves are eliminated (e.g., receiver-side deghosting), or waves with a particular (non-linear) polarization are suppressed (e.g., receiver-side polarization filtering). Thus, the methods described herein may be applied in conjunction with, simultaneously with, or after such processing of two or more of such multiple components.

Throughout the description of the present disclosure we have made use of Fourier transforms to transform the data separating and isolating wave fields of interest and ghost wave fields as well as estimating redatuming operators. It will be appreciated by those skilled in the art that other transforms such as Radon transforms, tau-p transforms, etc., can also be used for the same purpose. Furthermore, those skilled in the art may also prefer to implement the methods presented directly in the space and or time domain. In such cases the transforms presented herein are replaced by their respective representations or mathematical equivalents in such domains, which can take either explicit or approximated/truncated forms and applied to the wave field data representation in the respective domain.

While various embodiments of the present disclosure have been described above, it should be understood that they have been presented by way of example only, and not of limitation. For example, it should be noted that where filtering steps are carried out in the frequency-wavenumber space, filters with the equivalent effect can also be implemented in many other domains such as tau-p or space-time.

Further, it should be understood that the various features, aspects and functionality described in one or more of the individual embodiments are not limited in their applicability to the particular embodiment with which they are described, but instead can be applied, alone or in various combinations, to one or more of the other embodiments of the disclosure.

The methods described herein may be understood as a series of logical steps and (or grouped with) corresponding numerical calculations acting on suitable digital representations of the obtained wave field quantities and hence may be implemented as computer programs or software comprising sequences of machine-readable instructions and compiled code, which, when executed on the computer produce a the intended output in a suitable digital representation. More specifically, a computer program may comprise machine-readable instructions to perform the following tasks:

(1) Reading all or part of a suitable digital representation of the obtained wave field quantities into memory from a (local) storage medium (e.g., disk/tape), or from a (remote) network location;

(2) Repeatedly operating on the all or part of the digital representation of the obtained wave field quantities read into memory using a central processing unit (CPU), a (general purpose) graphical processing unit (GPU), or other suitable processor. As already mentioned, such operations may be of a logical nature or of an arithmetic (i.e., computational) nature. Typically the results of many intermediate operations are temporarily held in memory or, in case of memory intensive computations, stored on disk and used for subsequent operations; and (3) Outputting all or part of a suitable digital representation of the results produced when there no further instructions to execute by transferring the results from memory to a (local) storage medium (e.g., disk/tape) or a (remote) network location.

Computer programs may run with or without user interaction, which takes place using input and output devices such as keyboards or a mouse and display. Users can influence the program execution based on intermediate results shown on the display or by entering suitable values for parameters that are required for the program execution. For example, in one embodiment, the user could be prompted to enter information about e.g., the average inline shot point interval or source spacing. Alternatively, such information could be extracted or computed from metadata that are routinely stored with the seismic data, including for example data stored in the so-called headers of each seismic trace.

Figure 11:
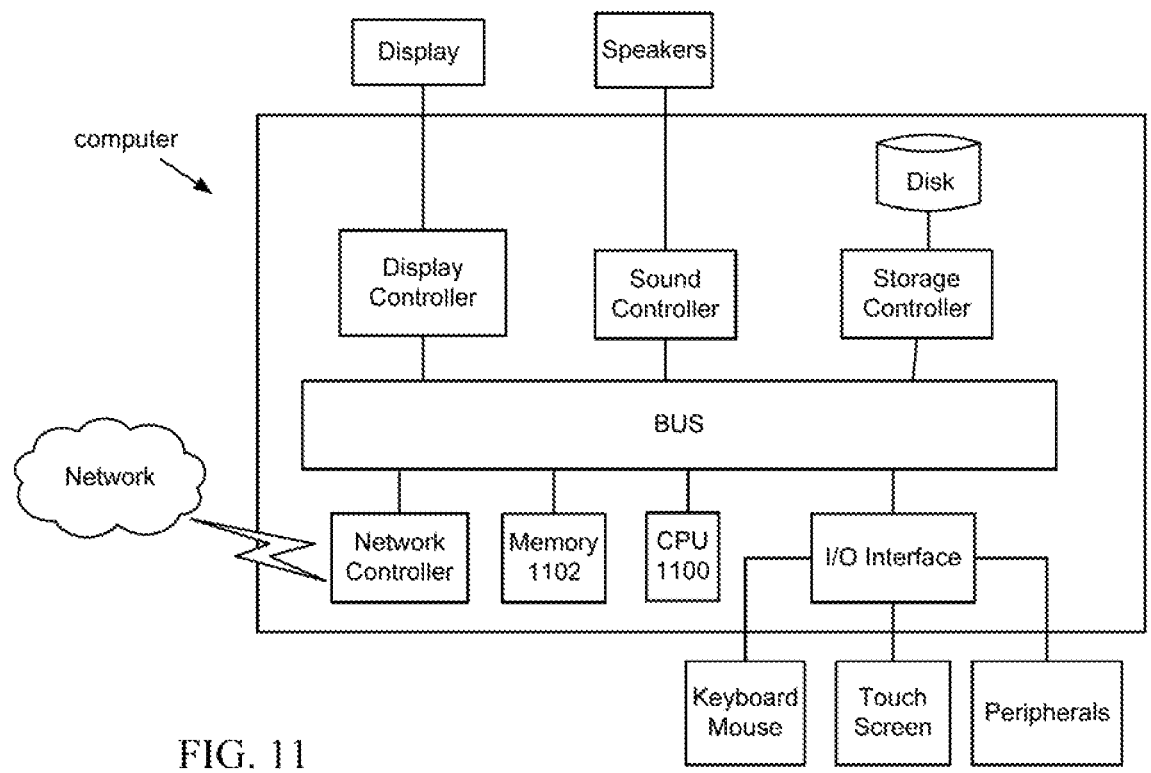
FIG. 11 illustrates hardware components of a computer.

Next, a hardware description of a computer or computers used to perform the functionality of the above-described exemplary embodiments is described with reference to FIG. 11. In FIG. 11, the computer includes a CPU 1100 (an example of "processing circuitry") that performs the processes described above. The process data and instructions may be stored in memory 1102. These processes and instructions may also be stored on a storage medium disk such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which computer communicates, such as a server or another computer.

Further, the claimed advancements may be provided as a utility application, background daemon, or component of an operating system, or combination thereof; executing in conjunction with CPU 1100 and an operating system such as Microsoft Windows 7, UNIX, Solaris, LINUX, Apple MAC-OS and other systems known to those skilled in the art.

The hardware elements in order to achieve the computer can be realized by various circuitry elements, known to those skilled in the art. For example, CPU 1100 can be a Xenon or Core processor from Intel of America or an Opteron processor from AMD of America, or may be other processor types that would be recognized by one of ordinary skill in the art. Alternatively, the CPU 1100 can be implemented on an FPGA, ASIC, PLD or using discrete logic circuits, as one of ordinary skill in the art would recognize. Further, CPU 1100 can be implemented as multiple processors cooperatively working in parallel to perform the instructions of the inventive processes described above.

LIST OF CITED REFERENCES

Bracewell, R., 1999, The Fourier Transform & Its Applications: McGraw-Hill Science, ed. 3.
Candes, E., Demanet, L., and Ying, L., 2009, A fast butterfly algorithm for the computation of Fourier integral operators. Multiscale Modeling & Simulation, 7(4):1727-1750.

Halliday, D. J. O. A. Robertsson, I. Vasconcelos, D. J. van Manen, R. M. Laws, A. K. Ozdemir and H. Gronaas, 2012, Full-wavefield, towed-marine seismic acquisition and applications: 82nd SEG Conference Las Vegas, 2012.

Halliday, D. F., 2013, Source-side deghosting—A comparison of approaches: 83rd Annual International Meeting, SEG, Expanded Abstracts, 67-71, doi: 10.1190/segam2013-0556.1.

Hopperstad, J. F., R. Laws, and E. Kragh, 2008a, Fundamental principles of isotropic marine source design: 70th Annual International Conference and Exhibition Incorporating SPE EUROPEC 2008, EAGE, Extended Abstracts, B025, doi: 10.3997/2214-4609.20147605.

Hopperstad, J. F., R. Laws, and E. Kragh, 2008b, Where is the center of a multi-depth marine source array?: 78th Annual International Meeting, SEG, Expanded Abstracts, 40-44, doi: 10.1190/1.3054834.

Muijs R., Robertsson, J. O. A., and Holliger, K., 2007, Prestack depth migration of primary and surface-related multiple reflections: Part I—Imaging: Geophysics, 72, S59-S69.

O'Neil, M., and Rokhlin, V., 2007, A new class of analysis-based fast transforms. Technical report, DTIC Document.

Robertsson, van Manen, Halliday and Laws, 2008, Seismic data acquisition and source-side derivatives generation and application: US20080019215A, WO2008014080A3, U.S. Pat. No. 7,876,642B2, US74926651B2, US20090097357A1, EP2049919B1, EP2138868A3, US201111832A.

Robertsson, J. O. A., D. F. Halliday, D. J. van Manen, I. Vasconcelos, R. M. Laws, K. Ozdemir, and H. Gronaas, 2012, Full-wavefield, Towed-marine Seismic Acquisition and Applications: 74th EAGE Conference, Copenhagen, June 2012.

Robertsson, J. O. A., R. M. Laws, and J. E. Kragh, 2015, Marine seismic methods, in Resources in the near-surface Earth (eds. L. Slater and D. Bercovici), Treatise on Geophysics, $2^{nd}$ edition (ed. G. Schubert), Elsevier-Pergamon, Oxford.

Stork, C., Kapoor, J., Zhao, W., Dragoset B., and K. Dingwall, 2006, Predicting and removing complex 3D surface multiples with WEM modeling—an alternative to 3D SRME for wide azimuth surveys?: Expanded abstract at the 76th SEG Annual Meeting.

van Melle, F. A. and Weatherburn, K. R., 1953, Ghost reflections caused by energy initially reflected above the level of the shot: Geophysics, 18, 793-804.

The invention claimed is:

1. A method, comprising:
    obtaining wave field recordings by at least one of activating physical sources located at least at corresponding first and second distances from a reference surface or using physical receivers located at least at corresponding third and fourth distances from the reference surface;
    forming, by processing circuitry from the obtained wave field recordings, a gather, the gather including obtained wave field recordings of multiple lateral offsets and corresponding to a distribution of distances from the reference surface for either the physical sources or the physical receivers;
    applying, by the processing circuitry, a transform to the gather, the transform acting on the distribution of distances from the reference surface to partition or map a first wave field of interest that propagates away from the reference surface and a second wave field that propagates towards the reference surface into at least two different cones in a transformed domain;
    using, by the processing circuitry, a relative contribution of mapped contributions of the physical sources or the physical receivers corresponding to the first wave field of interest in the transformed domain to mapped contributions of the physical sources or the physical receivers corresponding to the transformed second wave field inside at least one of the at least two different cones to isolate the first wave field of interest and the second wave field, or estimate a redatuming operator;
    generating, by the processing circuitry, a sub-surface representation of structures or Earth media properties from the first wave field of interest or the second wave field, or by using the estimated redatuming operator to process the obtained wave field recordings; and
    outputting the generated sub-surface representation.

2. The method of claim 1, wherein the isolating step further comprises using the redatuming operator to isolate at least one of the first wave field of interest and the second wave field.

3. The method of claim 1, wherein the reference surface corresponds to one of a virtual surface and an actual reflector of seismic energy.

4. The method of claim 3, wherein the reference surface corresponds to an actual reflector, and a model of the reflection coefficient and a location of the reflector is included in the isolation of the first wave field of interest or the second wave field, or in the estimating of the redatuming operator.

5. The method of claim 4, wherein the isolating step further comprises using the reflection coefficient and the location of the actual reflector and at least two mapped cones of the first wave field of interest and the second wave field to isolate or estimate at least one of the first wave field of interest, the second wave field, and the redatuming operator.

6. The method of claim 4, wherein the isolating step further comprises using the reflection coefficient and the location of the actual reflector and at least two mapped cones of the first wave field of interest and the second wave field to solve for at least one of the first wave field of interest, the second wave field, and the redatuming operator by means of estimation and regularization, to conduct cross-line deghosting from a line of recordings.

7. The method of claim 4, wherein the isolating step further comprises using the reflection coefficient and the location of the actual reflector and at least two mapped cones of the first wave field of interest and the second wave field to solve for at least one of the first wave field of interest, the second wave field, and the redatuming operator by means of estimating parameters of an assumed Fourier-domain planar support.

8. The method of claim 7, further comprising using the estimated parameters of the assumed Fourier-domain planar support to conduct cross-line deghosting from a line of recordings.

9. The method of claim 7, where the step of estimating the parameters of the assumed Fourier-domain planar support includes estimating the parameters on at least one of a local space and time domain subsets of the formed gather.

10. The method of claim 1, wherein the isolating step further comprises using an initial estimate of the redatuming operator to iteratively solve for at least one of the first wave field of interest and the second wave field, or to estimate the redatuming operator.

11. The method of claim 1, wherein the transform is one of a Fourier transform, a Radon transform, and a tau-p transform.

12. The method of claim 11, further comprising replacing the transform by a representation or mathematical equivalent in a space or time domain.

13. The method of claim 1, wherein the gather is a 2D line gather of data or a 3D carpet gather of data.

14. The method of claim 1, wherein the redatuming operator is used to at least one of create an image of the sub-surface from the obtained wave field recordings, remove multiples from the obtained wave field recordings, and regularize the obtained wave field recordings.

15. The method of claim 1, wherein the wave field recordings correspond to one of land seismic data, marine seismic data, seabed seismic data, permanent monitoring seismic data, time-lapse seismic data, transition zone seismic data or borehole seismic data with (near) surface or downhole placed receivers, and sources including VSP, 3D VSP, or distributed acoustic sensing seismic data.

16. The method of claim 1, wherein lateral locations of the sources or the receivers are perturbed or have a non-uniform distribution, and the distance distributions of the sources and receivers are perturbed or have a non-uniform distribution.

17. The method of claim 1, further comprising
using further periodic variations in one or more source activation parameters, including: activation time, signal strength, source signal spectrum, and source position at activation time, to achieve joint simultaneous separation and source wave field separation or deghosting.

18. A method for estimating a redatuming operator, comprising:
obtaining wave field recordings by at least one of activating physical sources located at least at corresponding first and second distances from a reference surface or using physical receivers located at least at corresponding third and fourth distances from the reference surface;
forming, by processing circuitry from the obtained wave field recordings, a gather, the gather including obtained wave field recordings of multiple lateral offsets and corresponding to a distribution of distances from the reference surface for either the physical sources or the physical receivers;
applying, by the processing circuitry, a transform to the gather, the transform acting on the distribution of distances from the reference surface to partition or map the obtained wave field recordings into at least two different cones in a transformed domain;
using, by the processing circuitry, a relative contribution of mapped contributions of the physical sources or the physical receivers inside at least one of the at least two different cones to estimate the redatuming operator; and
generating, by the processing circuitry, a sub-surface representation of structures or Earth media properties by means of using the estimated redatuming operator to process the obtained wave field recordings; and
outputting the generated sub-surface representation.

19. A method, comprising:
obtaining wave field recordings based on a near-simultaneous activation of at least two sources at different distances from a reference surface along an activation line or grid, varying at least one parameter between the sources from one activation to another, the at least one parameter being one or more of a source signal amplitude, a source signal spectrum, a source activation time, and a source location at activation time, such that the varying of the at least one parameter causes one or more scaled replications of a wave field with limited cone-shaped support in the frequency-wavenumber domain of at least one of the sources along one or more wavenumber directions;
separating, by processing circuitry, a contribution of at least two of the sources to the obtained wave field recordings as generated by the at least two sources individually in an absence of the other sources;
forming, by the processing circuitry, from the separated contributions, a gather, the gather including separated contributions of multiple lateral offsets and a distribution of distances from the reference surface;
applying, by the processing circuitry, a transform to the gather, the transform acting on the distribution of distances from the reference surface of the physical sources to partition or map a first wave field of interest that propagates away from the reference surface and a second wave field that propagates towards the reference surface, into at least two different cones in a transformed domain;
using, by the processing circuitry, a relative contribution of mapped contributions of the physical sources corresponding to the first wave field of interest in the transformed domain to mapped contributions of the physical sources corresponding to the transformed second wave field inside at least one of the at least two different cones to isolate the first wave field of interest and the second wave field, or estimate a redatuming operator; and
generating, by the processing circuitry, a sub-surface representation of structures or Earth media properties from the first wave field of interest or the second wave field, or by using the estimated redatuming operator to process the obtained wave field recordings; and
outputting the generated sub-surface representation.

20. The method of claim 19, wherein the first wave field of interest and the second wave field are used jointly to derive one or more of a gradient, a component of the displacement, a velocity, and an acceleration of the wave fields in a direction normal to the reference surface.

21. An apparatus, comprising:
processing circuitry configured to
obtain wave field recordings by at least one of activating physical sources located at least at corresponding first and second distances from a reference surface or using physical receivers located at least at corresponding third and fourth distances from the reference surface;
form, from the obtained wave field recordings, a gather, the gather including obtained wave field recordings of multiple lateral offsets and corresponding to a distribution of distances from the reference surface for either the physical sources or the physical receivers;
apply a transform to the gather, the transform acting on the distribution of distances from the reference surface to partition or map a first wave field of interest that propagates away from the reference surface and a second wave field that propagates towards the reference surface into at least two different cones in a transformed domain;
use a relative contribution of mapped contributions of the physical sources or the physical receivers corresponding to the first wave field of interest in the transformed domain to mapped contributions of the physical sources or the physical receivers corresponding to the transformed second wave field inside at least one of the at least two different cones to isolate the first wave field of interest and the second wave field, or estimate a redatuming operator;

generate a sub-surface representation of structures or Earth media properties from the first wave field of interest or the second wave field, or by using the estimated redatuming operator to process the obtained wave field recordings; and output the generated sub-surface representation.

* * * * *